United States Patent [19]

Kato et al.

[11] Patent Number: 5,164,451

[45] Date of Patent: Nov. 17, 1992

[54] MALEIMIDE COPOLYMER, MALEIMIDE BLOCK COPOLYMER AND METHOD FOR PRODUCING MALEIMIDE BLOCK COPOLYMER

[75] Inventors: Kenji Kato; Kazunori Doiuchi; Yasumi Koinuma; Yukinori Haruta, all of Oita; Kazuyoshi Aoshima, Aichi, all of Japan

[73] Assignee: Nippon Oil and Fats Co., Ltd., Japan

[21] Appl. No.: 896,488

[22] Filed: Jun. 2, 1992

Related U.S. Application Data

[63] Continuation of Ser. No. 439,413, Nov. 20, 1989, abandoned.

[30] Foreign Application Priority Data

Nov. 22, 1988 [JP] Japan .................................. 63-293486

[51] Int. Cl.⁵ ...................... C08F 4/36; C08F 293/00; C08F 267/10
[52] U.S. Cl. .................................... 525/282; 525/263; 525/302; 525/309; 525/317; 525/322; 526/262; 526/328; 526/341; 526/343; 526/344; 526/351; 526/352

[58] Field of Search ............... 525/263, 302, 309, 317, 525/322, 282

[56] References Cited

U.S. PATENT DOCUMENTS

| | | | |
|---|---|---|---|
| 3,860,674 | 1/1975 | Sheppard | 525/273 |
| 4,238,381 | 12/1980 | Komai | 525/419 |
| 4,283,512 | 8/1981 | Matsushima | 525/438 |
| 4,318,834 | 3/1982 | Ohmura | 525/539 |
| 4,394,480 | 7/1983 | Ujikawa | 525/43 |
| 4,681,918 | 7/1987 | Webster | 525/282 |
| 4,957,973 | 9/1990 | Sogah | 525/282 |

Primary Examiner—Carman J. Seccuro, Jr.
Assistant Examiner—Vasu S. Jagannathan
Attorney, Agent, or Firm—Malcolm B. Wittenberg

[57] ABSTRACT

The maleimide copolymer of the invention is of the class of N-substituted maleimide copolymer such as N-alkyl or N-aromatic maleimide copolymer having peroxy bonds in a molecule, utilizable as a precursor for preparing a maleimide block copolymer and as a modifier for other resins. The maleimide block copolymer, which is useful as a molding material or a thermal resistance improver, is obtained by polymerizing maleimide monomers in the presence of a polymeric peroxide followed by polymerizing vinyl monomers.

4 Claims, 4 Drawing Sheets

MALEIMIDE COPOLYMER, MALEIMIDE BLOCK COPOLYMER AND METHOD FOR PRODUCING MALEIMIDE BLOCK COPOLYMER

This is a continuation of co-pending application Ser. No. 439,413 filed on Nov. 20, 1989 abandoned.

BACKGROUND OF THE INVENTION

This invention relates to a maleimide copolymer, a maleimide block copolymer, and a method for producing a block copolymer. More particularly, it relates to a novel maleimide copolymer having peroxy bond in a molecule which is utilized as a precursor for a maleimide block copolymer and as a modifier for other resins. This invention also relates to a maleimide block copolymer which may be produced by polymerizing a maleimide compound and a vinyl monomer using a polymeric peroxide as a polymerization initiator and subsequently polymerizing another vinyl monomer and which may be useful as a molding material, as an additive for improving thermal resistance of other resins or as a compatibilizer for polymer blends and a method for producing such maleimide block copolymer.

As a vinyl polymer having peroxy bond in the molecule, there is disclosed polystyrene having peroxy bond in the molecule in "Kogyo Kagaku Zasshi", by Sugimura et al, Vol. 69, p. 718 (1966), while there are disclosed in Japanese Patent Publication No. 14567/1987 polystyrene, polyvinyl acetate, polymethacrylate or polyvinyl chloride, each having peroxy bond in the molecule. However, no mention has been made of the maleimide polymer in the above publications.

On the other hand, there are also known homopolymers of a maleimide compound and copolymers thereof with vinyl monomers as resins having high thermal resistance. It has also been proposed in Japanese Laid-open Patent Application No. 162543/1986 to add a random copolymer of the maleimide compound and methyl (meth)acrylate to a vinyl chloride resin to improve its thermal resistance.

It is also known to polymerize a vinyl monomer in two stages, using a polymeric peroxide as an initiator, to produce a block copolymer. For example, there is disclosed in Japanese Patent Publication No. 52845/1986 a block copolymer comprised of a methyl (meth)acrylate polymer and polystyrene as unit blocks, while there is disclosed in Japanese Laid-open Patent Application No. 202261/1984 a block copolymer having a wider range of vinyl polymers as block units.

Meanwhile, homopolymers of the maleimide compound has a drawback that, while it is excellent in thermal resistance, it is extremely poor in moldability, while being inferior in compatibility with other resins. Hence, a resin excellent not only in thermal resistance but also in moldability has not yet obtained. On the other hand, no mention is made of the maleimide block copolymer in the aforementioned publications concerning the block copolymers.

SUMMARY OF THE INVENTION

It is a principal object of the present invention to provide a maleimide copolymer having peroxy bond in its molecule which is useful as a precursor for a maleimide block copolymer or as a modifier for other resins and which is excellent in safety and is easily handled.

It is another object of the present invention to provide a maleimide block copolymer exhibiting both excellent thermal resistance and mechanical properties as well as good moldability and useful as an additive for improving thermal resistance of other resins as a molding material, or as a compatibilizer for polymer blends and a method for producing the same.

The above and other objects of the invention will become apparent from the following description.

According to the present invention, there is provided a maleimide copolymer having a weight average molecular weight of 2,000 to 500,000 and including peroxy bond in a molecule thereof, the maleimide copolymer comprising:

20 to 90 wt. % of a structural unit represented by the formula (I)

wherein $R_1$ and $R_2$ each stand for a hydrogen atom, a halogen atom or a methyl group and $R_3$ stands for a straight chain or branched chain C1 to C18 alkyl group, a C3 to C12 cycloalkyl group, or a C6 to C18 aryl group or alkyl-substituted aryl group;

10 to 70 wt. % of a structural unit represented by the formula (II)

wherein $R_4$ stands for a hydrogen atom or a methyl group and $R_5$ stands for a phenyl group, an alkyl-substituted phenyl group, a halogen-substituted phenyl group, an acetyl group, a nitrile group, a chlorine atom or a group

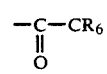

with $R_6$ being a C1 to C18 alkyl group; and 0.1 to 10 wt. % of a structural unit represented by the formula (III)

wherein $R_7$ stands for a C2 to C10 alkylene group, and $R_8$ stands for a C2 to C10 alkylene group, $+CH_2)_2O(CH_2+_x$, $+CH_2)_2O(CH_2)_2O(CH_2+_2$,

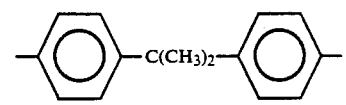

or

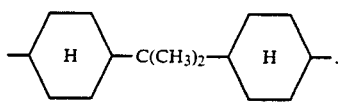

According to the present invention, there is also provided a maleimide copolymer having a viscosity average molecular weight of 1,700 to 530,000 and including peroxy bond in a molecule thereof, the maleimide copolymer comprising:

90 to 99.9 wt. % of a structural unit represented by the formula (I′)

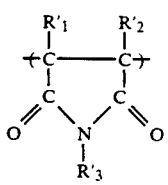 (I′)

wherein $R'_1$ and $R'_2$ each stand for a hydrogen atom, a halogen atom or a methyl group, $R'_3$ stands for a straight chain or branched chain C1 to C18 alkyl group, a C3 to C12 cycloalkyl group, a C6 to C18 aryl group or a substituted aryl group; and 0.1 to 10 wt. % of a structural unit including peroxy bond selected from one or more of the group consisting of the formula (II′)

 (II′)

wherein $R'_4$ stands for a C2 to C10 alkylene group and $R'_5$ stands for a C2 to C10 alkylene group, $+CH_2)_2O(CH_2)_2$, $+CH_2)_2O(CH_2)_2O(CH_2)_2$,

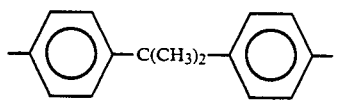

or

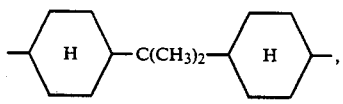

; the formula (III′)

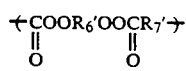 (III′)

where $R'_6$ stands for —C(CH$_3$)$_2$CH$_2$CH$_2$C(CH$_3$)$_2$—,

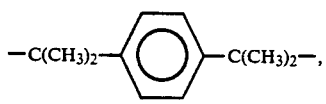

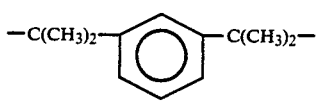

or

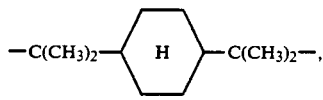

and $R'_7$ stands for a C2 to C10 alkylene group, cyclohexylene group or phenylene group, ; and the formula (IV′)

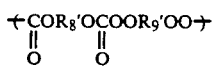 (IV′)

wherein $R'_8$ stands for a C2 to C10 alkylene group, cyclohexylene group or phenylene group and $R'_9$ stands for —C(CH$_3$)$_2$CH$_2$CH$_2$C(CH$_3$)$_2$—,

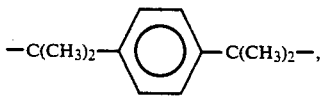

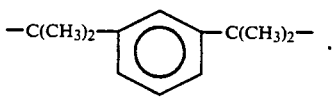

or

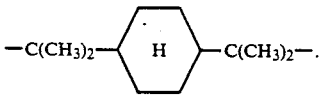

According to the present invention, there is also provided an A-B type maleimide block copolymer comprising:

a block unit A having a viscosity average molecular weight of 2,000 to 500,000, the block unit A being represented by the formula (I″)

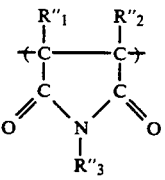 (I″)

wherein $R''_1$, $R''_2$ each stand for a hydrogen atom, a halogen atom or a methyl group and $R''_3$ stands for a straight chain or branched chain C1 to C18 alkyl group, a C3 to C12 cycloalkyl group or a C6 to C18 aryl group or substituted aryl group; and a block unit B having a viscosity average molecular weight of 2,000 to 500,000, the block unit B being selected from the group consisting of a homopolymer and a random copolymer having a structural unit of the formula (II′)

 (II″)

wherein $R''_4$ stands for a hydrogen atom or a methyl group and $R''_5$ stands for a hydrogen atom, a chlorine atom, a phenyl group, an alkyl-substituted phenyl group, an acetyl group, a nitrile group or a group

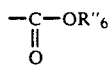

where $R''_6$ stands for a C1 to C18 alkyl group.

According to the present invention, there is also provided a method for producing a maleimide block copolymer comprising polymerizing a maleimide copolymer having peroxy bond in a molecule thereof; the maleimide copolymer being produced by polymerizing a maleimide compound having the formula (III'')

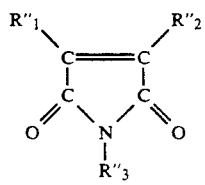

wherein $R''_1$, $R''_2$ each stand for a hydrogen atom, a halogen atom or a methyl group, $R''_3$ stands for a straight chain or branched chain C1 to C18 alkyl group, a C3 to C12 cycloalkyl group or a C6 to C18 aryl group or substituted aryl group, in the presence of a polymeric peroxide, ; with a monomer having the formula (IV'')

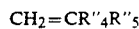

$$CH_2=CR''_4R''_5 \quad (IV'')$$

where $R''_4$ stands for a hydrogen atom or a methyl group and $R''_5$ stands for a hydrogen atom, a chlorine atom, a phenyl group, an alkyl-substituted phenyl group, an acetyl group, a nitrile group or a group

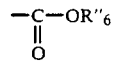

where $R''_6$ stands for a C1 to C18 alkyl group.

According to the present invention, there is also provided an A'-B' type maleimide block copolymer comprising:

a block unit A' having a viscosity average molecular weight of 2,000 to 500,000, the block unit A' being a random copolymer containing 30 to 90 wt. % of a structural unit represented by the formula (I''')

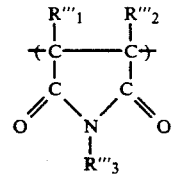

wherein $R'''_1$, $R''_2$ each stand for a hydrogen atom, a halogen atom or a methyl group, $R''_3$ stands for a straight chain or branched chain C1 to C18 alkyl group, a C3 to C12 cycloalkyl group, or a C6 to C18 aryl group or substituted aryl group, and 70 to 10 wt. % of a structural unit represented by the formula (II'')

$$+CH_2-CR''_4R''_5+ \quad (II'')$$

wherein $R''_4$ stands for a hydrogen atom or a methyl group and $R''_5$ stands for a hydrogen atom, a chlorine atom, a phenyl group, an alkyl-substituted phenyl group, an acetyl group or a group

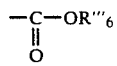

where $R'''_6$ stands for a C1 to C18 alkyl group; and a block unit B' having a viscosity average molecular weight of 2,000 to 500,000, the block unit B' being selected from the group consisting of a homopolymer and a random copolymer having a structural unit of the formula (III''')

$$+CH_2-CR''_7R''_8+ \quad (III''')$$

wherein $R''_7$ stands for a hydrogen atom or a methyl group and $R''_8$ stands for a hydrogen atom, a chlorine atom, a phenyl group, an alkyl-substituted phenyl group, an acetyl group or a group

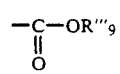

where $R''_9$ stands for a C1 to C18 alkyl group.

According to the present invention, there is additionally provided a method for producing a maleimide block copolymer comprising polymerizing:

a maleimide copolymer having peroxy bond in a molecule, the maleimide copolymer being produced by polymerizing, in the presence of a polymeric peroxide, a maleimide compound having the formula (IV''')

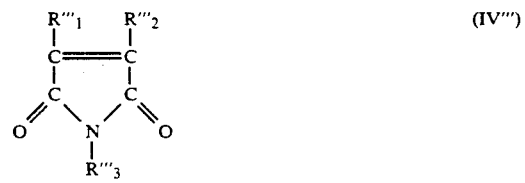

wherein $R''_1$, $R''_2$ each stand for a hydrogen atom, a halogen atom or a methyl group, $R''_3$ stands for a straight chain or branched chain C1 to C18 alkyl group, a C3 to C12 cycloalkyl group, or a C6 to C18 aryl group or substituted aryl group, and a vinyl monomer having the formula (V'')

$$CH_2=CR''_4 R''_5 \quad (V'')$$

wherein $R''_4$ stands for a hydrogen atom or a methyl group and $R''_5$ stands for a chlorine atom, a hydrogen atom, a phenyl group, an alkyl-substituted phenyl group, an acetyl group or a group

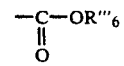

where $R'''_6$ stands for a C1 to C18 alkyl group
; with a monomer represented by the formula (VI'')

$$CH_2=CR''_7R''_8 \quad (VI'')$$

wherein $R''_7$ stands for a hydrogen atom or a methyl group and $R''_8$ stands for a hydrogen atom, a chlorine atom, a phenyl group, an alkyl-substituted phenyl group, an acetyl group or a group

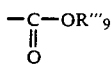

where $R'''_9$ stands for a C1 to C18 alkyl group.

PREFERRED EMBODIMENTS OF THE INVENTION

Figure 1:
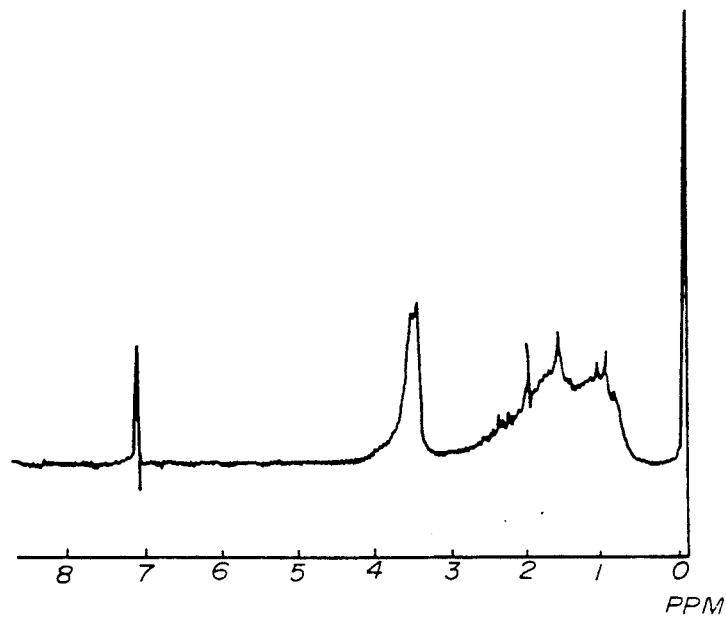
FIG. 1 shows a chart of NMR spectrum of a copolymer having peroxy bond in the molecule prepared from methyl methacrylate and cyclohexyl maleimide according to Example 1—1.

The present invention will be explained in detail hereinbelow.

The maleimide copolymer having peroxy bond in the molecule, according to the present invention, is characterized in that it contains, in a certain compositional ratio, a maleimide compound structural unit, referred to hereinafter as MIC, a specified vinyl compound structural unit, referred to hereinafter as VIC and a specified polymeric peroxide structural unit, referred to hereinafter as PMPOC.

The MIC employed in the maleimide copolymer having peroxy bond in the molecule, according to the present invention, is represented by the following formula (I)

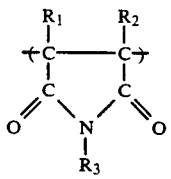

wherein $R_1$, $R_2$ each stand for a hydrogen atom, a halogen atom or a methyl group, $R_3$ stands for a straight chain or branched chain C1 to C18 alkyl group, a C3 to C12 cycloalkyl group, or a C6 to C18 aryl group or alkyl-substituted aryl group. If $R_3$ is an alkyl, an aryl group or an alkyl-substituted aryl group having 19 or more carbon atoms or a cycloalkyl group having 13 or more carbon atoms, it becomes difficult to produce the polymer. A monomer forming the MIC shown by the formula (I) may be selected from the group consisting of, for example, N-methyl maleimide, N-ethyl maleimide, N-n-propyl maleimide, N-i-propyl maleimide, N-n-butyl maleimide, N-t-butyl maleimide, N-2-ethylhexyl maleimide, N-dodecyl maleimide, N-octadecyl maleimide, N-cyclohexyl maleimide, N-cyclododecyl maleimide, N-phenyl maleimide, N-2-methylphenyl maleimide, N-3-isopropylphenyl maleimide, N-benzyl maleimide and mixtures thereof.

The VIC employed in the maleimide copolymer having peroxy bond in the molecule, according to the present invention, is represented by the following formula (II)

$$+CH_2-CR_4R_5+ \qquad (II)$$

wherein $R_4$ stands for a hydrogen atom or a methyl group and $R_5$ stands for a phenyl group, an alkyl-substituted phenyl group, a halogen-substituted phenyl group, an acetyl group, a nitrile group, a chlorine atom or a group

wherein $R_6$ stands for a C1 to C18 alkyl group. If $R_6$ is an alkyl group having 19 or more carbon atoms, it becomes difficult to produce the polymer. Monomers forming the VIC represented by the formula (II) may preferably include aromatic vinyl monomers, such as styrene, α-methylstyrene or p-methylstyrene or vinyl acetate, (meth)acrylic esters, such as methyl (meth)acrylate, ethyl (meth)acrylate or n-butyl (meth)acrylate, acrylonitrile, methacrylonitrile or vinyl chloride.

The PMPOC employed in the maleimide copolymer having peroxy bond in the molecule, according to the present invention, is represented by the following formula (III)

where $R_7$ stands for a C4 to C10 alkylene group and $R_8$ stands for a C2 to C10 alkylene group, $+CH_2)_2O(CH_2)_2$, $+CH_2)_2O(CH_2)_2O(CH_2+)_2$,

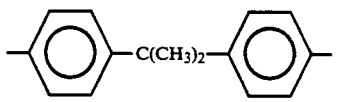

or

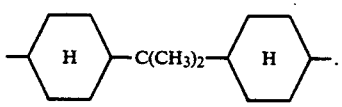

If $R_7$ and $R_8$ are an alkylene group having 11 or more carbon atoms, it becomes difficult to produce the polymer. A monomer forming the PMPOC represented by the formula (III) may be a diacyl type polymeric peroxide in which the peroxy group may exist thermally stably in the produced copolymer and which also functions as a polymerization initiator. It may be produced by, for example, the method described in Japanese Patent Publication No. 14567/1987. The diacyl type polymeric peroxides may preferably include

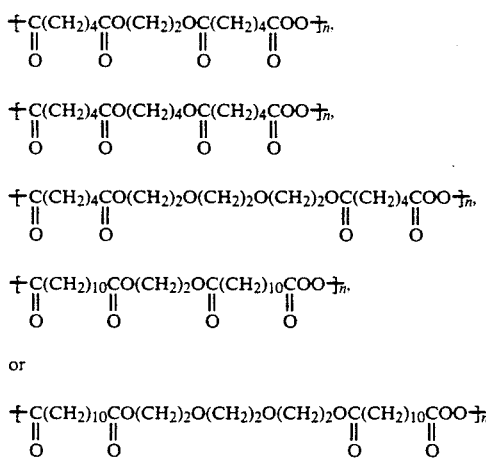

wherein n stands for a positive number of from 2 to 20.

According to the present invention, the compositional ratio of the structural units in the maleimide copolymer having peroxy bond in the molecule is 20 to 90 wt. % of MIC, 10 to 70 wt. % of VIC and 0.1 to 10 wt. % of PMPOC. If the compositional ratio of MIC is more than 90 wt. % and that of VIC is less than 10 wt. %, the produced copolymer is lowered in compatibility with other resins of the copolymer, while the mechanical strength of the copolymer is lowered, so that the properties required of a modifier cannot be exhibited sufficiently. If the compositional ratio of MIC is less than 20 wt. % and that of VIC is more than 70 wt. %, the thermal resistance of the produced copolymer is lowered such that the copolymer is not useful as a modifier or as a precursor for the block copolymer. If the compositional ratio of PMPOC is more than 10 wt. %, the peroxy concentration in the produced copolymer is increased such that the risk and the difficulties in handling are increased, whereas, if the compositional ratio is less than 0.1 wt. %, the compositional ratio of the peroxy groups is lowered such that the produced copolymer is not useful as a precursor for the block copolymer.

According to the present invention, the MIC and PMPOC contents in the maleimide copolymer having the peroxy bond in the molecule may be determined by measuring the total nitrogen quantity in the maleimide copolymer having peroxy bond in the molecule by, for example, the Kjeldahl method, and by measuring the quantity of active oxygen by, for example, the iodometric method, respectively.

The molecular weight of the maleimide copolymer of the present invention, which can be determined by the limiting viscosity method or the gel permeation chromatography (GPC), should be in the range of from 2,000 to 500,000 in terms of the weight average molecular weight calculated as polystyrene by the GPC method. If the weight average molecular weight is less than 2,000, the thermal resistance is insufficient, such that the produced copolymer is not useful as a precursor for the maleimide block copolymer or as a modifier for other resins. If the weight average molecular weight is more than 500,000, the produced copolymer is lowered in solubility in solvents or vinyl monomers, such that it can be handled only difficultly as a precursor for the block copolymer, while the compatibility of the copolymer with other resins is also lowered.

The maleimide copolymer having peroxy bond in the molecule, according to the present invention, may be produced by the known polymerization methods, such as, for example, solution polymerization, suspension polymerization or block polymerization. More specifically, it may be produced by polymerizing the MIC, VIC and PMPOC monomers preferably at the polymerization temperature of 40° to 120° C. and for the polymerization time period of 3 to 20 hours. These monomers may be used alone or as a mixture. The charged amounts of the monomers are preferably 20 to 90 parts by weight of the MIC monomer, 10 to 70 parts by weight of the VIC monomer and 0.2 to 20 parts by weight of the PMPOC monomer. With these charged amounts, the ratio of the MIC and VIC in the produced copolymer becomes equal to the charged ratio. On the other hand, the PMPOC remaining after decomposition of the peroxy bond exists as the residual group in the copolymer molecule such that the residual quantity of the PMPOC is determined by the polymerization temperature and the duration of polymerization.

Another maleimide copolymer having peroxy bond in the molecule, according to the present invention, is characterized by the content of the MIC and PMPOC at a predetermined ratio.

The MIC employed in the maleimide copolymer having peroxy bond in the molecule, according to the present invention, is represented by the following formula (I')

which represents a structural unit similar to that expressed by the formula (I). In the above formula, the meanings of $R'_1$, $R'_2$ and $R'_3$ are the same as those for $R_1$, $R_2$ and $R_3$ of the formula (I).

The PMPOC employed in another maleimide copolymer having peroxy bond in the molecule, according to the present invention, is presented by the following formulas (II'), (III') or (IV'):

where $R'_4$ stands for a C2 to C10 alkylene group and $R'_5$ stands for a C2 to C10 alkylene group, $-CH_2CH_2OCH_2CH_2-$ or $-CH_2CH_2OCH_2CH_2OCH_2HC_2-$, $R_6$ stand for $-C(CH_3)_2CH_2CH_2C(CH_3)_2-$,

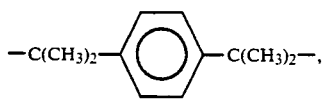

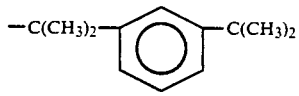

or

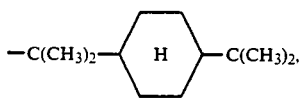

R'₇ stands for a C2 to C10 alkylene group, cyclohexylene group or phenylene group, R'₈ stands for a C2 to C10 alkylene group, cyclohexylene group or phenylene group and R'₉ stands for —C(CH₃)₂CH₂CH₂C(CH₃)₂—,

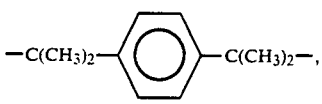

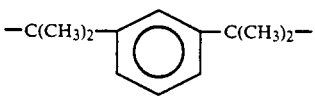

or

The monomer forming the PMPOC represented by the formulas (II') to (IV') exhibits excellent polymerizability with MIC, similarly to the monomers shown by the formula (III), such that peroxy groups may exist in thermally stably in the produced maleimide copolymer. This monomer also functions as the polymerization initiator such that the polymerization initiation efficiency is also improved.

The PMPOC of the formula (II'), employed in the other maleimide copolymer having peroxy bond in the molecule, according to the present invention, is of the diacyl type, similarly to the PMPOC of the formula (III).

The PMPOC of the formula (III'), employed in the other maleimide copolymer, according to the present invention, may be of the ester type, and may be produced by, for example, reacting a dibasic acid dichloride with alkylene dihydroperoxide in the presence of an aqueous solution of sodium hydroxide. Such ester type polymeric peroxides may preferably include

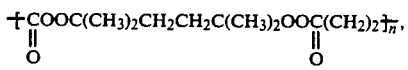

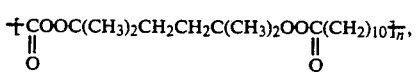

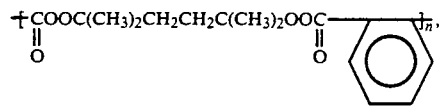

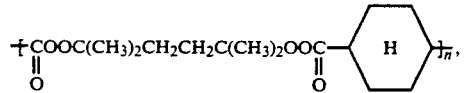

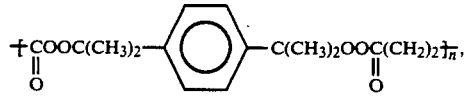

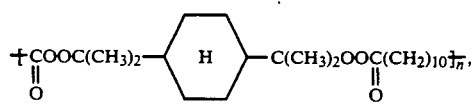

where n stands for a positive number of from 2 to 20.

The PMPOC of the formula (IV'), employed in the other maleimide copolymer, according to the present invention, may be of the carbonate type, and may be produced by, for example, reacting a divalent alcohol with phosgene, more specifically, by reacting alkylene dichloroformate and dihydroperoxide in the presence of an aqueous solution of sodium hydroxide. Such carbonate type polymeric peroxides may preferably include

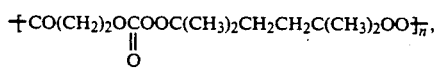

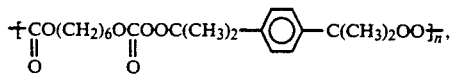

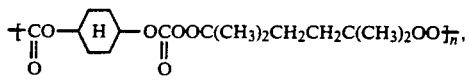

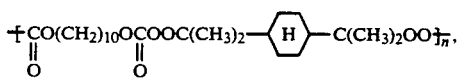

and

Another maleimide copolymer having peroxy bond in the molecule, according to the present invention, is a polymer of the above mentioned MIC with at least one of the PMPOC shown by the formula (II'), the PMPOC shown by the formula (III') or the PMPOC shown by the formula (IV'). Selection of the PMPOCs is performed on the basis of solubility and a decomposition temperature of the peroxy bond at selected half-life value for 10 hours, which is the temperature at which the concentration of the peroxy groups is reduced by one half after 10 hours and which may be used as the index for the rate of thermal decomposition of the peroxy groups. In making such selection, account is also taken of the peroxy bond which is desirable when producing a block copolymer by polymerizing a maleimide copolymer of the present invention having peroxy bond in the molecule with another vinyl monomer, that is, the decomposition temperature at selected half-life value for 10 hours and the polymerization initiation efficiency. The compositional ratio of MIC and that of PMPOC are 90 to 99.9 wt. % and 10 to 0.1 wt. %, respectively. If the content of MIC is more than 99.9 wt. %, that is, if the content of PMPOC is less than 0.1 wt. %, the compositional ratio of PMPOC is so small that the copolymer cannot be used as a modifier or as a precursor for the block copolymer. On the other hand, if the compositional ratio of MIC is less than 90 wt. %, that is, if the compositional ratio of PMPOC is more than 10 wt. %, the concentration of PMPOC becomes so high that the handling risk is increased and the storage stability is lowered. The content of MIC may be determined by measuring the amount of total nitrogen in the other produced maleimide copolymer having peroxy bond in the molecule, such as by the Kjeldahl method, while the content of PMPOC may be determined by measuring the quantity of active oxygen such as by the iodometric method.

The viscosity average molecular weight of the maleimide copolymer having peroxy linkage in the molecule, according to the present invention, is in the range of from 1,700 to 530,000. If the viscosity average molecular weight is less than 1,700, molecular weight decreases so that the maleimide copolymer cannot be used as a precursor for producing the block copolymer having superior thermal resistance. If the viscosity average molecular weight is more than 530,000, solubility of the copolymer in solvents is lowered so that it becomes difficult to remove impurities. The viscosity average molecular weight as defined in the other maleimide copolymer of the present invention means a viscosity average molecular weight which is calculated as polystyrene from the limiting viscosity. Specifically, the viscosity average molecular weight is found from the limiting viscosity [$\eta$] in accordance with the following formula (x)

$$[\eta\pi = K \cdot [\overline{MV}]^\alpha \quad (x)$$

wherein K is a constant such that $K \times 10^3 (100 \text{ ml/g}) = 0.0716$, and $\alpha = 0.76$ is a value for polystyrene in a chloroform solution at 25° C. ("Polymer Handbook", second edition, IV-17, issued by Wiley Interscience Co.). It is noted that the value of the limiting viscosity of 0.02 to 1.6 corresponds to the viscosity average molecular weight of 1,700 to 530,000, calculated as polystyrene.

According to the present invention, the viscosity average molecular weight of the maleimide copolymer may be measured by, for example, the gel permeation chromatography (GPC).

The maleimide copolymer having peroxy bond in the molecule, according to the present invention, may be produced by the known polymerization methods, such as solution polymerization, suspension polymerization or block polymerization. More specifically, they may be produced by polymerizing the MIC monomer and the PMPOC monomer preferably at the polymerization temperature of 40° to 120° C. and for the polymerization period of 3 to 20 hours. Preferably, 0.2 to 30 and more preferably 0.5 to 20 parts by weight of the PMPOC monomer is charged to 100 parts by weight of the MIC monomer. The charged amount of the PMPOC monomer of less than 0.2 part by weight is not desirable since then the rate of polymerization is lowered significantly while the peroxy concentration in the produced maleimide copolymer having the peroxy bond in the molecule is also lowered, whereas the charged amount of the PMPOC of more than 30 parts by weight is also not desirable since then the polymerization reaction may proceed in an uncontrolled manner because of the extremely high peroxy concentration.

An A-B type maleimide block copolymer of the present invention is an A-B type block copolymer substantially comprised of a block unit A formed by MIC and a block unit B comprised of a homopolymer or a random copolymer of a specified vinyl compound structural unit, referred to hereinafter as VC.

The MIC forming the block unit A in the A-B type maleimide block copolymer of the present invention is represented by the following formula (I''), which is similar to the formula (I):

wherein the meanings of $R''_1$, $R''_2$ and $R''_3$ are the same as those for $R_1$, $R_2$ and $R_3$ of the formula (I).

According to the present invention, the monomer forming the block unit B is represented by the formula (II'), which is similar to the formula (II),

wherein the meanings of $R''_4$, $R''_5$ are the same as those of $R_4$, $R_5$ of the above formula (II). Provided, however, that $R''_5$ may stand for a hydrogen atom or a chlorine atom in addition to what is meant by $R_5$. Accordingly, the monomer of the formula (II'') further contains vinyl monomers such as ethylene or propylene.

With the A-B type maleimide block copolymer of the present invention, the viscosity average molecular weight of the block unit A is in the range of from 2,000 to 500,000, whereas that of the block unit B is similarly in the range of from 2,000 to 500,000. These molecular weights may be measured by the known method, for example, employing the limiting viscosity or GPC method. The molecular weight of each of these block units of less than 2,000 is not desirable since the thermal resistance of the maleimide copolymer of the block unit A is not exhibited sufficiently and the mechanical properties of the polymer of the vinyl monomer of the block unit B becomes insufficient. The molecular weight higher than 500,000 is also not desirable since the fluidity and moldability as well as compatibility with other resins are lowered because their molecular weights are too high. The preferred content ratio of the block units A to B is 5 wt. % ~ 95 wt. % : 95 wt. % ~ 5 wt. %. based on the total weight of the maleimide block copolymer.

For producing the A-B type maleimide block copolymer of the present invention, the maleimide compound is polymerized in the presence of the polymeric peroxide to produce a maleimide copolymer having peroxy bond in the molecule. Such polymeric peroxides may preferably include PMPOC selected from the group consisting of the formulas (II'), (III') and (IV') and mixtures thereof. However, $R_7'$ and $R_8'$ in the formulas (III') and (IV') do not stand for a cyclohexylene group so that in the corresponding formulas in the appended claims, different symbols are used.

These polymeric peroxides are preferably employed in an amount of 0.2 to 20 wt. % to 99.8 to 80 wt. % of the total monomers of the block copolymer. The amount of the polymeric peroxide less than 0.2 wt. % is not desirable since the polymerization is considerably retarded or occasionally cannot be brought to completion. The amount of the polymeric peroxide more than 20 wt. % is also not desirable since there is the risk that the polymerization reaction may proceed in an uncontrolled manner. The ratio of the charged amounts of the maleimide polymer of the block unit A having peroxy bond in the molecule to the monomer forming the block unit B is preferably 1:0.05 to 20.

For producing the A-B type maleimide block copolymer of the present invention, the MIC monomer is polymerized in the presence of the polymeric peroxide, that is, using the polymeric peroxide as the polymerization initiator, to produce the maleimide copolymer having polymeric peroxy residues in the molecule, that is the block unit A. The block unit A is then polymerized with the above mentioned VC monomer of the block unit B to produce the maleimide block copolymer comprised of the block units A-B. Although any of the known polymerization methods, such as suspension polymerization, solution polymerization, solution suspension polymerization or block polymerization, may be employed, it is not preferred to use such solvents as will permit extensive chain shifting or chain movement, in view of the block efficiency. The operation of polymerization may be performed continuously or by producing the block unit A first and then performing the polymerization of the block unit B after taking out the block unit A from the reaction system. There is no specific limitation to the sequence of polymerization of the block units as long as the block copolymer composed of the block units A and B is produced. The polymerization temperature is usually 30° to 120° C. and preferably 40° to 90° C. The polymerization time is preferably 0.5 to 10 hours for each of the block units A and B, with the total polymerization time being 1 to 20 hours. While the time of termination of the preparation of the block unit A is determined as a function of the maleimide charged ratio and the rate of polymerization, it is usually preferred for the residual monomer amount to be not higher than 0.5 wt. %. If the residual monomer amount is higher than 0.5 wt. %, the residual monomer need be removed, such as by washing, prior to polymerization of the block unit B, thus complicating the operation.

An A'-B' type maleimide block copolymer of the present invention is substantially composed of a block unit A' comprised of MIC and a specific vinyl compound structural unit, referred to hereinafter as VC-1, and a block unit B' composed of a homopolymer or a random copolymer of a specified vinyl compound structural unit, referred to hereinafter as VC-2.

According to the present invention, the block unit A' is a random copolymer of MIC and VC-1, wherein MIC is represented by the following formula (I''), which is similar to the formula (I):

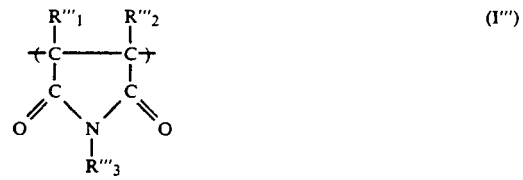

wherein the meanings of $R''_1$, $R''_2$ and $R''_3$ are the same as those of $R_1$, $R_2$ and $R_3$ of the formula (I) above.

On the other hand, the VC-1 is represented by the following formula (II''), which is similar to the formula (II) above:

wherein the meanings of $R''_4$ and $R''_5$ are the same as those of $R_4$ and $R_5$ of the formula (II) above. Provided, however, that $R''_5$ may stand for a hydrogen atom or a chlorine atom in addition to what is meant by $R_5$. Accordingly, the monomer of the formula (II'') further contains vinyl monomers such as ethylene or propylene.

In the block unit A', the content of MIC is 30 to 90 wt. %, whereas the content of VC-1 is 70 to 10 wt. %. If the content of MIC is less than 30 wt. %, that is if the content of VC-1 is higher than 70 wt.%, the thermal resistance of the block copolymer is lowered, whereas, if the content of MIC is higher than 90 wt. %, that is if the content of VC-1 is lower than 10 wt. %, the impact resistance of the block copolymer is lowered.

With the A'-B' type maleimide block copolymer of the present invention, the block unit B' is a homopolymer or a random copolymer of VC-2. Examples of VC-2 preferably include one or more selected from the compounds similar to VC-1.

The A'-B' type maleimide block copolymer of the present invention may be produced in the presence of polymeric peroxides. Examples of the polymeric peroxides preferably include PMPOCs selected from the group consisting of the formulas (II'), (III'), (IV') and mixtures thereof. However, $R_7'$ in the formula (II') does not stand for a cyclohexylene group so that different symbols are used in the corresponding formula in the appended claims.

The amount of the polymeric peroxides is preferably in the range of from 0.2 to 20 wt. % to 99.8 to 80 wt. % of the total monomers forming the block copolymer. If the amount of the polymeric peroxide is less than 0.2 wt. %, polymerization may be retarded considerably or occasionally may not be brought to completion, whereas, if it is more than 20 wt. %, there is a risk that polymerization may proceed in an uncontrolled manner.

When producing the A'-B' type maleimide block copolymer of the present invention, the charged ratio of MIC to VC-1 is preferably 1:0.1 to 2.3 whereas the charge ratio of the block unit A' to the block unit B' or VC-2 is preferably 1:0.05 to 20.

When producing the A'-B' type maleimide block copolymer of the present invention, the MIC monomer and the VC-1 monomer are polymerized in the presence of the polymeric peroxide, that is, using the polymeric peroxide as the polymerization initiator, to produce a maleimide random copolymer having polymeric peroxide residue in the molecule, that is the block unit A'. The block unit A' and the VC-2 monomer forming the block unit B' are polymerized to produce a maleimide block copolymer comprised of the block units A'-B'. Although any of the known polymerization methods, such as suspension polymerization, solution polymerization, solution suspension polymerization may be employed, it is not preferred to use such solvents as will permit extensive chain shifting or chain movement, in view of the block efficiency. The operation of polymerization may be performed continuously or by producing the block unit A' first and then performing the polymerization of the block unit B' after taking out the block unit A' from the reaction system. There is not specific limitation to the sequence of polymerization of the block units as long as the block copolymer composed of the block units A' and B' is produced. The polymerization temperature is usually 30° to 120° C. and preferably 40° to 90° C. The polymerization time is preferably 0.5 to 10 hours for each of the block units A' and B', with the total polymerization time being 1 to 20 hours. While the time of termination of the preparation of the block unit A' is determined as a function of the maleimide charged ratio and the rate of polymerization, it is usually preferred for the residual monomer amount to be not higher than 0.5 wt. %. If the residual monomer amount is higher than 0.5 wt. %, the residual monomer need be removed, such as by washing, prior to polymerization of the block unit B', thus complicating the operation. The viscosity average molecular weight of the block unit A' is in the range of from 2,000 to 500,000, whereas that of the block unit B' is similarly in the range of from 2,000 to 500,000. These molecular weights may be measured by the known method, for example, employing the limiting viscosity or GPC method. The molecular weight of each of these block units of less than 2,000 is not desirable since the thermal resistance of the maleimide copolymer of the block unit A' and the mechanical properties of the polymer of the vinyl monomer of the block unit B' are not exhibited sufficiently. The molecular weight higher than 500,000 is also not desirable since the moldability as well as compatibility with other resins are lowered because their molecular weights are too high.

The viscosity average molecular weight of the A-B type and A'-B' type maleimide block copolymers of the present invention may be determined by using a light-scattering photometer or by GPC or viscosity methods, whereas the maleimide content ratio in each block copolymer may be determined by mesuring the total nitrogen quantity found by the Kjeldahl method or elementary analysis. The vinyl monomer segment content may be found by IR spectrum analysis or nuclear magnetic resonance analysis, whereas the ratio of the block copolymer in the copolymer may be found by mesuring the weight of the non-block copolymer which is isolated by extraction or fractionation.

The maleimide copolymer having peroxy bond in the molecule, according to the present invention, is excellent in safety and handling properties because of the optimum compositional ratio of the MIC having high thermal resistance and PMPOC having the function of initiating radical polymerization. The maleimide copolymer is also excellent in solubility in vinyl monomers, other resins or solvents, so that it may be utilized as a precursor for maleimide block copolymers or as a modifier for other resins.

The A-B and A'-B' type maleimide block copolymers of the present invention are substantially comprised of a block unit formed by a homopolymer or copolymer of the maleimide compound and a block unit composed of the vinyl monomer, so that they exhibit thermal resistance and mechanical properties, such as moldability, simultaneously. Thus, the block copolymer is a well-balanced heat-resistant molding material, while being useful as an additive to other resins or as a compatibilizer for polymer blends.

EXAMPLES OF THE INVENTION

The present invention will be explained in more detail with reference to Reference Examples, Comparative Examples and Examples. In these Examples, parts are indicated by those by weights.

REFERENCE EXAMPLES 1—1

Preparation of

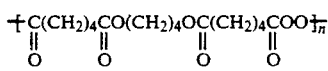

370 parts of chloride adipate and 62 parts of ethyleneglycol were charged into a four-mouthed flask fitted with a thermometer and a stirrer and stirred at 20° C. for 30 minutes under a nitrogen gas atmosphere to produce 350 parts of viscous colorless liquid ethyleneglycol bis(adipoyl chloride).

Then, 75 parts of 50 wt. % aqueous hydrogen peroxide and 1040 parts of 10% aqueous solution of sodium hydroxide were charged into a four-mouthed flask fitted with a thermometer, a stirrer and a dropping funnel to prepare an aqueous solution of sodium peroxide, into which 350 parts of the above reaction product were added dropwise at 0° to 5° C. for 30 minutes with stirring. After the stirring was continued for one hour, the produced solid was isolated by a filter. The resulting product was washed twice with water and dried in vacuum to produce 300 parts of a white-colored solid product, which was then dissolved and recrystallized twice in a chloroform/methanol solvent and dried in vacuum to produce 210 parts of a purified white-colored solid product.

The molecular weight of the produced white-colored solid product, as measured by a device operating in accordance with the vapor pressure equilibrium method ("VPO-115" manufactured by Hitachi Seisakusho Co., Ltd.), was 1960 ($n \approx 6.2$). The purity of the product, as measured from the quantity of active oxygen by iodometry, was 93.4%.

As a result of analyses of IR absorption spectrum, absorption by the carbonyl group of the diacyl linkage was noticed at 1780 cm$^{-1}$ and at 1805 cm$^{-1}$ while absorption of the carbonyl group of the ester group and absorption of the peroxy bond were noticed at 1725 cm$^{-1}$ and at 875 cm$^{-1}$, respectively.

EXAMPLE 1—1

250 parts of an aqueous solution of 0.3 wt. % polyvinyl alcohol were charged into a four-mouthed flask fitted with a thermometer, a stirrer and a Dimroth condenser, into which was subsequently charged a solution in 10 parts of methylethylketone of 48 parts of cyclohexyl maleimide, 32 parts of methyl methacrylate and 10 parts of polymeric peroxide of the structural formula

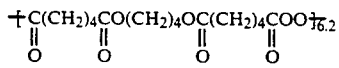

prepared in Reference Example 1—1. Polymerization was then carried out at 70° C. for 8 hours under agitation while the atmosphere inside the reactor was replaced by a nitrogen gas. After the reaction system was cooled to room temperature, the precipitated solid substance was filtered, washed twice with 2 lit. of water and dried in vacuum. The resulting product was dissolved in chloroform and a large quantity of methanol was charged into the solution to precipitate crystals. The resulting product was filtered and dried in vacuum to produce 67 parts of a white-colored solid product.

The weight average molecular weight of the white-colored solid product, computed as polyethylene, was measured by the GPC method, and found to be 196000. The amount of active oxygen of the white-colored solid copolymer was measured by an iodometric method. The content of the polymeric peroxide introduced into the molecule was found to be 4.6 wt. %. Analyses of IR absorption spectrum showed the absorption by the carbonyl group of the diacyl peroxy residue at 1780 cm$^{-1}$ and at 1805 cm$^{-1}$, the absorption by the carbonyl group of methyl methacrylate at 1725 cm$^{-1}$ and the absorption by the carbonyl group of the maleimide residue at 1700 cm$^{-1}$, respectively. The total amount of nitrogen as found by the Kjeldahl analysis was 4.4 wt. %, so that the content ratio of cyclohexyl maleimide in the copolymer was 56.7 wt. %.

Figure 2:
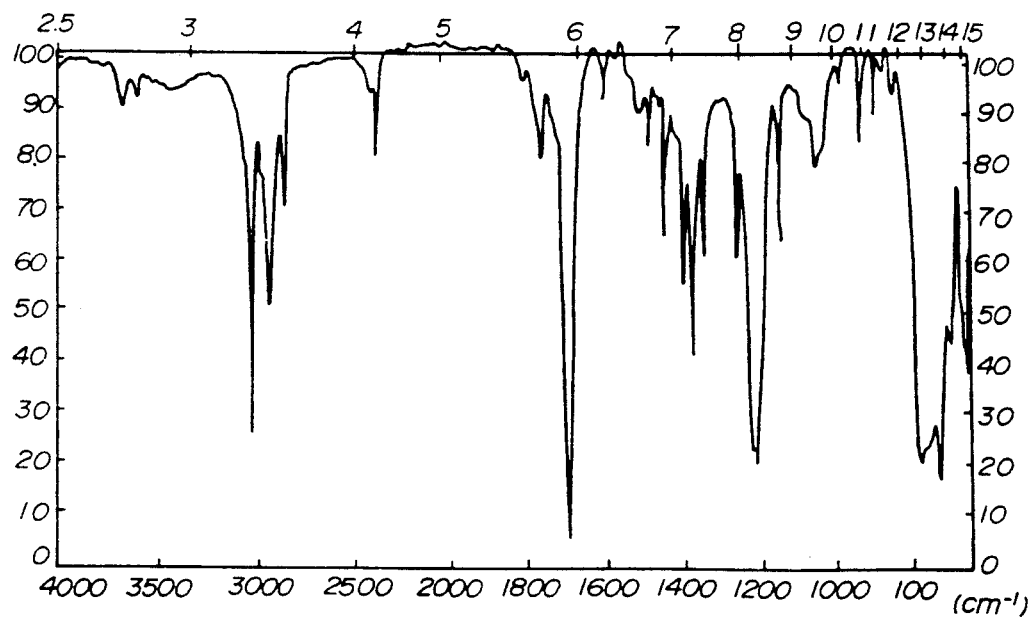
FIG. 2 shows a chart of IR spectrum of a copolymer having peroxy bond in the molecule prepared from methyl methacrylate and cyclohexyl maleimide according to Example 1—1.

These results are shown in Table 1—1. The NMR spectrum and the IR spectrum of the produced copolymer are shown in FIGS. 1 and 2, respectively.

From the above, the produced white-colored solid product was identified as a cyclohexyl maleimide - methyl methacrylate copolymer having peroxy bond in the molecule.

EXAMPLES 1-2 TO 1-5

Maleimide copolymers, each having peroxy bond in the molecule, were prepared in the same way as in Example 1—1, except changing the kinds and charged amounts of the maleimide compounds, vinyl monomers and polymeric peroxides, polymerization temperature and polymerization time, as shown in Table 1—1. These conditions and the results are shown in Table 1—1.

TABLE 1-1

Maleimide Copolymer by Suspension Polymerization Having Peroxide Linkage in Molecule

| No. | Examples | | | | |
|---|---|---|---|---|---|
| | 1-1 | 1-2 | 1-3 | 1-4 | 1-5 |
| Maleimides Charge (in parts) | Cyclohexyl Maleimide 48 | Methyl Maleimide 40 | Benzyl Maleimide 90 | Octadecyl Maleimide 20 | Cyclohexyl Maleimide 60 |
| Vinyl Monomers Charge (in parts) | Methyl Methacrylate 32 | n-Butyl Acrylate 40 Ethyl Acrylate 20 | Vinyl Acetate 10 | Methyl Methacrylate 40 Styrene 30 α-Methyl Styrene 10 | Styrene 28 Acrylonitrile 12 |
| Polymeric Peroxides | $+C(CH_2)_4CO(CH_2)_4OC(CH_2)_4COO+_{6.2}$ $\parallel$ $\parallel$ $\parallel$ O O O | Same as left | Same as left | $+C(CH_2)_4CO(CH_2CH_2O)_3C(CH_2)_4COO+$ $\parallel$ $\parallel$ O O | $+C(CH_2)_4CO(CH_2CH_2O)_3C(CH_2)_4COO+_{5.5}$ $\parallel$ $\parallel$ O O |
| Charge (in parts) | 10 | 20 | 3 | 4 | 2 |
| Solvents Charge (in parts) | Methylethylketone 10 | Toluene 10 | Methylethylketone 20 | — | Toluene 20 |
| Polymerization Temperature (°C.) | 70 | 80 | 60 | 70 | 55 |
| Polymerization Time (hr) | 8 | 5 | 12 | 8 | 18 |
| Polymer Yield (in parts) | 67 | 87 | 88 | 84 | 82 |
| Appearance | White Solid | White | White Solid | White Solid | Light Yellow Solid |
| Weight Average Molecular Weight (Computed as Polystyrene by GPC Method) | 196000 | 68000 | 226000 | 128000 | 495000 |
| Total Nitrogen (wt. %) | 4.4 | 4.37 | 6.70 | 0.85 | 4.6 |
| Percentage of Maleimide (wt. %) | 56.7 | 42.6 | 89.6 | 21.2 | 58.8 |
| Percentage of Polymeric Peroxide Residues Computed from Active Oxygen Amount (wt. %) | 4.6 | 8.6 | 0.8 | 1.6 | 0.5 |

EXAMPLE 1-6

80 parts of phenyl meleimide, 20 parts of styrene, 8 parts of a polymeric peroxide shown by the following formula

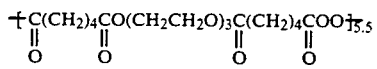

and 400 parts of toluene were charged into a four-mouthed flask fitted with a thermometer, a stirrer and a reflux condenser, and the reaction was carried out at 70° C. for five hours under a nitrogen gas stream. The produced liquid polymer was charged into 5 lit. of methanol to precipitate the polymer. 82 parts of a pale yellow polymer were produced after filtration and drying in vacuum. The weight average molecular weight of the produced polymer, computed as polystyrene, was measured by GPC analyses, and found to be 32000. The content of the polymeric peroxide, as found from the amount of active oxygen, measured by the iodometric method, was 3.6 wt. %, while the total amount of nitrogen as measured by Kjeldahl analysis, was 6.18 wt. %. Thus, the content of phenyl maleimide in the produced copolymer was 76.4 wt. %. The results of analyses of IR absorption spectrum showed the absorption by the carbonyl group of the diacyl peroxy residue at 1780 cm$^{-1}$ and at 1805 cm$^{-1}$ and the absorption by the carbonyl group of the phenyl maleimide residue at 1695 cm$^{-1}$. These results are shown in Table 1-2.

From the above, the polymer was identified as a phenyl maleimide - styrene copolymer having peroxy bond in the molecule.

EXAMPLES 1-7 TO 1-11

Maleimide copolymers, each having peroxy linkage in the molecule, were prepared in the same way as in Example 1-6, except changing the kinds and charged amounts of the maleimide compounds, vinyl monomers, polymeric peroxides and solvents, polymerization temperature and polymerization time, as shown in Table 1-2. These conditions and the results are shown in Table 1-2.

TABLE 1-2

Maleimide Copolymer by Solution Polymerization Having Peroxide Linkage in Molecule

| No. | Examples | | | | | |
|---|---|---|---|---|---|---|
| | 1-6 | 1-7 | 1-8 | 1-9 | 1-10 | 1-11 |
| Maleimides | Phenyl Maleimide 80 | t-Butyl Maleimide 40 | N-Phenyl-α-Methyl Maleimide 30 | Cyclohexyl Maleimide 50 | Benzyl Maleimide 90 | Methyl Maleimide 60 |
| Charge (in parts) | | | | | | |
| Vinyl Monomers | Styrene 20 | Methyl Methacrylate 40 n-Butyl Acrylate 20 | Styrene 49 Acrylonitrile 21 | Styrene 30 Methyl Methacrylate 20 | Vinyl Chloride 10 | Acrylonitrile 40 |
| Charge (in parts) | | | | | | |
| Polymeric Peroxides | $+C(CH_2)_4CO(CH_2CH_2O)_3C(CH_2)_4COO+_{5.5}$ $\quad \parallel \quad \parallel \quad \parallel \quad \parallel$ $\quad O \quad O \quad O \quad O$ | | | $+C(CH_2)_4COCH(CH_3)CH_2OC(CH_2)_4COO+_{7.7}$ $\quad \parallel \quad \parallel \quad \parallel \quad \parallel$ $\quad O \quad O \quad O \quad O$ | | |
| Charge (in parts) | 8 | 10 | 4 | 2 | 0.3 | 25 |
| Solvents | Toluene | Toluene | Tetrahydrofuran | Tetrahydrofuran 300 | Toluene 400 | Toluene 300 |
| Charge (in parts) | 400 | 500 | 300 | t-Butyl Alcohol 100 | Methylethylketone 100 | Dimetyl Formamide 100 |
| Polymerization Temperature (°C.) | 70 | 85 | 65 | 60 | 70 | 80 |
| Polymerization Time (hr) | 5 | 8 | 8 | 12 | 8 | 6 |
| Polymer Yield (in parts) | 82 | 86 | 92 | 91 | 88 | 92 |
| Appearance | Yellow Solid | White Solid | Pale Yellow Solid | White Solid | White Solid | White Solid |
| Weight Average Molecular Weight (Computed as Polystyrene by GPC Method) | 32000 | 2100 | 86000 | 12100 | 48000 | 12000 |
| Total Nitrogen (wt. %) | 6.18 | 3.53 | 2.26 | 4.0 | 6.61 | 5.97 |
| Percentage of Maleimide (wt. %) | 76.4 | 38.6 | 30.2 | 51.2 | 88.4 | 58.2 |
| Percentage of Polymeric Peroxide Residues Computed from Active Oxygen Amount (wt. %) | 3.6 | 2.6 | 2.2 | 0.8 | 0.1 | 8.6 |

REFERENCE EXAMPLE 2-1

Preparation of

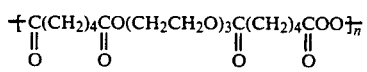

183 parts of chloride adipate and 75 parts of triethyleneglycol were charged into a four-mouthed flask fitted with a thermometer and a stirrer. The resulting mixture was stirred at 20° C. for 60 minutes under a nitrogen gas stream to produce 210 parts of viscous colorless liquid triethyleneglycol bis(adipoyl chloride).

420 parts of an aqueous solution of 10 wt. % sodium hydroxide and 50 wt. % aqueous hydrogen peroxide were charged into a four-mouthed flask fitted with a thermometer, a stirrer and a dropping funnel, to produce an aqueous solution of sodium peroxide. While the reaction system was stirred vigorously, and the reaction temperature was maintained at 5° C., 176 parts of the previously prepared triethyleneglycol bis(adipoyl chloride) were added dropwise to the reaction system over 20 minutes. After the stirring was continued for 30 minutes in this state, a white-colored product was produced. The product was filtered, washed twice with 1 lit. of cold water and dried in vacuum to produce 140 parts of white-colored powders. The molecular weight of the produced white-colored powders, as measured by an apparatus ("VPO-115" manufactured by Hitachi Seisakusho Co., Ltd.) operating in accordance with the vapor pressure equilibrium method, was 2340 (n≈5.8), while the amount of active oxygen, as measured by iodometry, was 2.19 wt. %. Thus, the purity of the product was 99.5%. Analyses by IR absorption spectrum showed the absorption by the carbonyl group of the ester group at 1725 cm$^{-1}$, the absorption by the carbonyl group of the diacyl group at 1780 cm$^{-1}$ and at 1805 cm$^{-1}$ and the absorption by the peroxy group at 875 cm$^{-1}$.

EXAMPLE 2-1

250 parts of an aqueous solution of 0.5 wt. % of polyvinyl alcohol were charged into a four-mouthed flask fitted with a thermometer, a stirrer and a Dimroth condenser. Then, a solution in 20 parts of methylethylketone of 80 parts of cyclohexyl maleimide and 10 parts of

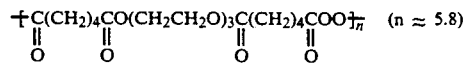

synthesized by the Reference Example 2-1 was charged into the reaction system. Polymerization was then carried out under stirring at 75° C. for three hours while the atmosphere in the reactor was replaced by a nitrogen gas. After the produced polymer was filtered and washed with water, it was dissolved in chloroform and charged into a large quantity of methanol to precipitate the polymer, which was then filtered and dried in vacuum to produce 76 parts of white-colored polymer powders.

Figure 3:
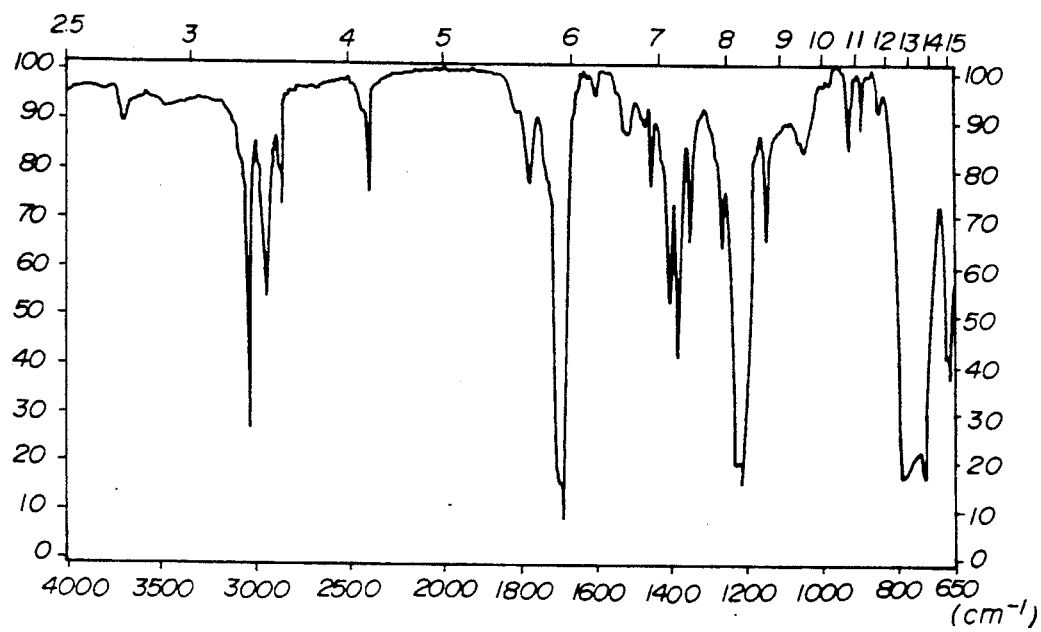
FIG. 3 shows a chart of IR spectrum of a maleimide copolymer having peroxy bond in the molecule which is prepared in Example 2-1.

The limiting viscosity [η] of the produced cyclohexyl maleimide copolymer, as measured in chloroform at 25° C., was 0.374, while its viscosity average molecular weight, computed as polystyrene, was 78000. The amount of active oxygen, as found by the iodometric method, was 0.23 wt. %. Thus the content of the peroxy group-containing structural unit introduced into the molecule was found to be 5.9 wt. The results of analyses of the IR absorption spectrum showed the absorption by the carbonyl group of the diacyl peroxy group of the polymeric peroxide at 1805 cm$^{-1}$ and at 1780 cm$^{-1}$ and the absorption by the carbonyl group of the maleimide group at 1700 cm$^{-1}$. From the above, the polymer was identified as a polycyclohexyl maleimide having peroxy bond in the molecule. FIG. 3 shows the IR chart of the product and Table 2-1 shows the reaction conditions and the results of measurement.

EXAMPLES 2—2 AND 2-3

Maleimide copolymers were prepared in the same way as in Example 2-1, except changing the kinds and the amounts of the maleimide compounds and the polymeric peroxides, the polymerization temperature and the polymerization time. The conditions and the results of measurement are shown in Table 2-1.

TABLE 2-1

| No. | Examples 2-1 | Examples 2-2 | Examples 2-3 |
|---|---|---|---|
| Maleimides<br>Charge (in parts) | Cyclohexyl Maleimide<br>80 | Phenyl Maleimide<br>80 | Isopropyl Maleimide<br>100 |
| Polymeric Peroxides | $+C(CH_2)_4CO(CH_2CH_2O)_3C(CH_2)_4COO+_{5,8}$<br>$\|\|\quad\quad\quad\quad\quad\quad\quad\quad\quad\quad\quad\quad\|\|$<br>$O\quad\quad\quad\quad\quad\quad\quad\quad\quad\quad\quad\quad\quad O$ | $+C(CH_2)_{10}COCH_2CH_2OC(CH_2)_{10}COO+_{9,0}$<br>$\|\|\quad\quad\quad\quad\|\|\quad\quad\quad\quad\quad\quad\quad\quad\|\|$<br>$O\quad\quad\quad\quad O\quad\quad\quad\quad\quad\quad\quad\quad O$ | $+COOC(CH_3)_2CH_2CH_2C(CH_3)_2OOC(CH_2)_2+_{7,6}$<br>$\|\|\quad\quad\quad\quad\quad\quad\quad\quad\quad\quad\quad\quad\quad\quad\quad\quad\|\|$<br>$O\quad\quad\quad\quad\quad\quad\quad\quad\quad\quad\quad\quad\quad\quad\quad\quad O$ |
| Charge (in parts) | 10 | 1 | 30 |
| Solvents | Methylethylketone | Methylethylketone | — |
| Charge (in parts) | 20 | 20 | — |
| Polymerization Temperature (°C.) | 75 | 55 | 90 |
| Polymerization Time (hr) | 3 | 12 | 12 |
| Appearance | White Powders | Pale Yellow Powders | White Powders |
| Polymer Yield (in parts) | 76 | 64 | 108 |
| Intrinsic Viscosity [η]<br>(at 25° C. in chloroform) | 0.374 | 1.49 | 0.34 |
| Viscosity Average Molecular<br>Weight (as polystyrene) | 78000 | 480000 | 69000 |
| Active Oxygen Amount (wt. %) | 0.23 | 0.02 | 0.60 |
| Percentage of Peroxy Group<br>Constitutional Units in Polymer<br>(wt. %) | 5.9 | 0.7 | 9.8 |

EXAMPLE 2-4

40 parts of benzyl maleimide, 10 parts of

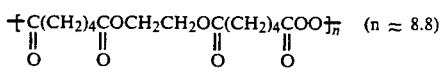

and 300 parts of tetrahydrofuran were charged into a four-mouthed flask fitted with a thermometer, a stirrer and a reflux condenser, and the reaction was carried out under stirring at 60° C. for three hours while the atmosphere within the system was replaced by a nitrogen gas. The polymer liquid was charged into a large quantity of methanol to precipitate the polymer. After filtration and drying in vacuum, 32 part of white-colored powders were produced.

The limiting viscosity [η] of the produced benzyl maleimide copolymer, as measured in chloroform at 25° C. was 0.225, while its viscosity average molecular weight, computed as polystyrene, was 40000. The amount of active oxygen, as found by the iodometric method, was 0.44 wt. %. The results of analyses of IR absorption spectrum showed the absorption by the carbonyl group of the diacyl group of the polymeric peroxide at 1805 cm$^{-1}$ and at 1780 cm$^{-1}$ and the absorption by the carbonyl group of the imide ring at 1700 cm$^{-1}$. From the above, the polymer was identified as a benzyl maleimide copolymer having peroxy bond in the molecule. Table 2—2 shows the reaction conditions and the results of measurement.

EXAMPLES 2-5 AND 2-8

Maleimide copolymers were prepared in the same way as in Example 2-4, except changing the kinds and the amounts of the maleimide compounds, the polymeric peroxides and the solvents, the polymerization temperature and the polymerization time. The conditions and the results of measurement are shown in Table 2—2.

TABLE 2-2

| No. | Examples | | |
|---|---|---|---|
| | 2-4 | 2-5 | 2-6 |
| Maleimides | Benzyl Maleimide | Phenyl Maleimide | Octadecyl Maleimide |
| Charge (in parts) | 40 | 50 | 30 |
| Polymeric Peroxides | $+C(CH_2)_4COCH_2CH_2OC(CH_2)_4COO+_{8.8}$ $\quad\quad \| \quad\quad\quad\quad \| \quad\quad\quad\quad \|$ $\quad\quad O \quad\quad\quad\quad O \quad\quad\quad\quad O$ | $+C(CH_2)_4CCH_2CH_2OC(CH_2)_4COO+_{8.8}$ $\quad\quad \| \quad\quad\quad\quad \| \quad\quad\quad\quad \|$ $\quad\quad O \quad\quad\quad\quad O \quad\quad\quad\quad O$ | $+COOC(CH_3)_2-\bigcirc-C(CH_3)_2OOC(CH_2)_2+_{7.7}$ $\quad\quad \| \quad\quad\quad\quad\quad\quad\quad\quad\quad\quad\quad\quad\quad\quad \|$ $\quad\quad O \quad\quad\quad\quad\quad\quad\quad\quad\quad\quad\quad\quad\quad\quad O$ |
| Charge (in parts) | 10 | 15 | 2 |
| Solvents | Tetrahydrofuran | Tetrahydrofuran | Toluene |
| Charge (in parts) | 300 | 300 | 200 |
| Polymerization Temperature (°C.) | 60 | 90 | 80 |
| Polymerization Time (hr) | 3 | 3 | 4 |
| Appearance | White Powders | Yellow Powders | White Powders |
| Polymer Yield (in parts) | 32 | 61 | 21 |
| Intrinsic Viscosity [η] (at 25° C. in chloroform) | 0.225 | 0.02 | 0.19 |
| Viscosity Average Molecular Weight (as polystyrene) | 40000 | 1700 | 32000 |
| Active Oxygen Amount (wt. %) | 0.44 | 0.28 | 0.22 |
| Percentage of Peroxy Group Constitutional Units in Polymer (wt. %) | 8.6 | 5.5 | 4.2 |

| No. | Examples | |
|---|---|---|
| | 2-7 | 2-8 |
| Maleimides | t-Butyl Maleimide | Methyl Maleimide |
| Charge (in parts) | 50 | 40 |
| Polymeric Peroxides | $+CO(CH_2)_2OCOOC(CH_3)_2CH_2CH_2C(CH_3)_2OO+_{12.3}$ $\quad\quad \| \quad\quad\quad\quad\quad\quad\quad\quad\quad\quad\quad\quad\quad\quad\quad \|$ $\quad\quad O \quad\quad\quad\quad\quad\quad\quad\quad\quad\quad\quad\quad\quad\quad\quad O$ | $+C(CH_2)_4CO(CH_2CH_2O)_3C(CH_2)_4COO+_{5.5}$ $\quad\quad \| \quad\quad\quad\quad \| \quad\quad\quad\quad \|$ $\quad\quad O \quad\quad\quad\quad O \quad\quad\quad\quad O$ |
| Charge (in parts) | 0.2 | 10 |
| Solvents | Toluene | Toluene |
| Charge (in parts) | 50 | 200 |
| Polymerization Temperature (°C.) | 100 | 60° C., then 80° C. |
| Polymerization Time (hr) | 1 | |
| Appearance | White Powders | White Powders |
| Polymer Yield (in parts) | 43 | 28 |
| Intrinsic Viscosity [η] (at 25° C. in chloroform) | 0.09 | 0.26 |
| Viscosity Average Molecular Weight (as polystyrene) | 12000 | 48000 |
| Active Oxygen Amount (wt. %) | 0.006 | 0.28 |
| Percentage of Peroxy Group Constitutional Units in Polymer (wt. %) | 0.11 | 5.0 |

REFERENCE EXAMPLE 3-1

Preparation of

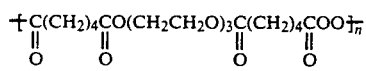

183 parts of dichloride adipate and 75 parts of triethyleneglycol were charged into a four-mouthed flask fitted with a thermometer and a stirrer, and the reaction system was stirred at 20° C. for 60 minutes under a nitrogen gas stream to produce 210 parts of viscous colorless liquid triethyleneglycol bis(adipoyl chloride).

210 parts of an aqueous solution of 20 wt. % potassium hydroxide and 50 wt. % aqueous hydrogen peroxide were charged into a four-mouthed flask fitted with a thermometer, a stirrer and a dropping funnel, to produce an aqueous solution of potassium. While the reaction system was stirred vigorously, and the reaction temperature was maintained at 5° to 7° C., 176 parts of the previously prepared triethyleneglycol bis(adipoyl chloride) were added dropwise to the reaction system over 20 minutes. After the stirring was continued for one hour in this state, a white-colored product was produced. This white-colored product was filtered, washed twice with 1 lit. of cold water and dried in vacuum. 145 parts of the dried product were obtained. The molecular weight of the white-colored solid product, as measured by an apparatus ("VPO-115" manufactured by Hitachi Seisakusho Co., Ltd.) operating in accordance with the vapor pressure equilibrium method, was 2620 ($n \approx 6.5$), while the amount of active oxygen, as measured by the iodometric method, was 2.21 wt. %. The purity of the product was 99.6 %. Analyses by IR absorption spectrum showed the absorption by the carbonyl group of the ester group at 1725 cm$^{-1}$, the absorption by the carbonyl group of the diacyl group at 1780 cm$^{-1}$ and at 1805 cm$^{-1}$ and the absorption by the peroxy group at 875 cm$^{-1}$.

EXAMPLE 3-1

300 parts of an aqueous solution of 5 wt. % polyvinyl alcohol (saponification degree, 88%) were charged into a four-mouthed flask fitted with a temperature, a stirrer and a Dimroth condenser. Into the same flask was dispersed and then charged a solution in 20 parts of methylethylketone of 80 parts of cyclohexyl maleimide and 10 parts of

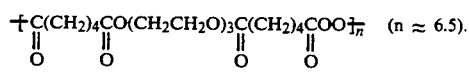

Figure 4:
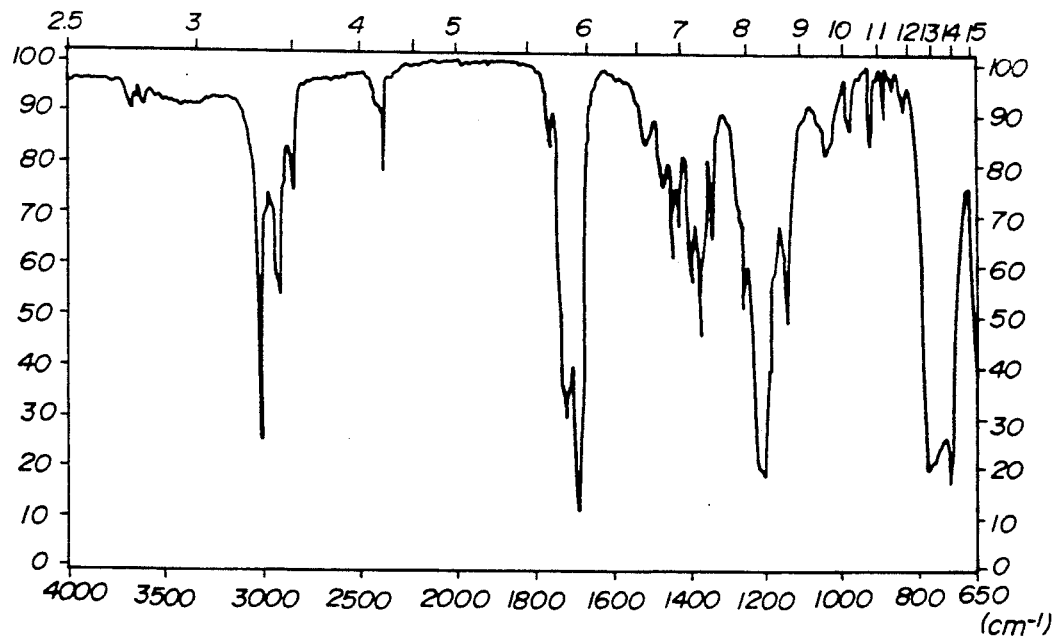
FIG. 4 shows a chart of IR spectrum of a cyclohexyl maleimide copolymer having peroxy bond in the molecule which is prepared in Example 3-1.

Polymerization was carried out under stirring at 65° C. for four hours while the atmosphere in the reactor was replaced by a nitrogen gas. After the reaction system was cooled to room temperature, a part of the produced polymer was taken out so as to be purified and analyzed in the following manner. After the polymer was washed with water, it was dissolved in chloroform and charged into a large quantity of methanol to precipitate the polymer, which was then filtered and dried in vacuum to produce white-colored powders. The limiting viscosity of the produced white-colored powders was measured in toluene at 30° C. The limiting viscosity [$\eta$] was 0.486, whereas the viscosity average molecular weight was 148000. The amount of active oxygen, as found by the iodometric method, was 0.25 wt. %, whereas the content ratio of the peroxy groups introduced into the polymer molecule was 6.4 wt. %. Analyses by IR absorption spectrum showed the absorption by the carbonyl group of the polymeric peroxide at 1805 cm$^{-1}$ and at 1780 cm$^{-1}$ and the absorption by the carbonyl group of the maleimide ring at 1695 cm$^{-1}$. The IR absorption spectrum is shown in the chart of FIG. 4.

From the above results, this polymer was identified as a cyclohexyl maleimide copolymer having peroxy bond in the molecule.

Then, 80 parts of a styrene monomer were introduced into a reaction vessel filled with the maleimide copolymer with stirring at room temperature, and the resulting mass was subjected to stirring and dispersion for one hour. The temperature was then raised and polymerization was carried out at 80° C. for 10 hours. The produced polymer was dissolved in chloroform and the resulting solution was charged into a large quantity of methanol to precipitate the polymer, which was then filtered and dried in vacuum to produce 148 parts of the white-colored polymer.

Figure 5:
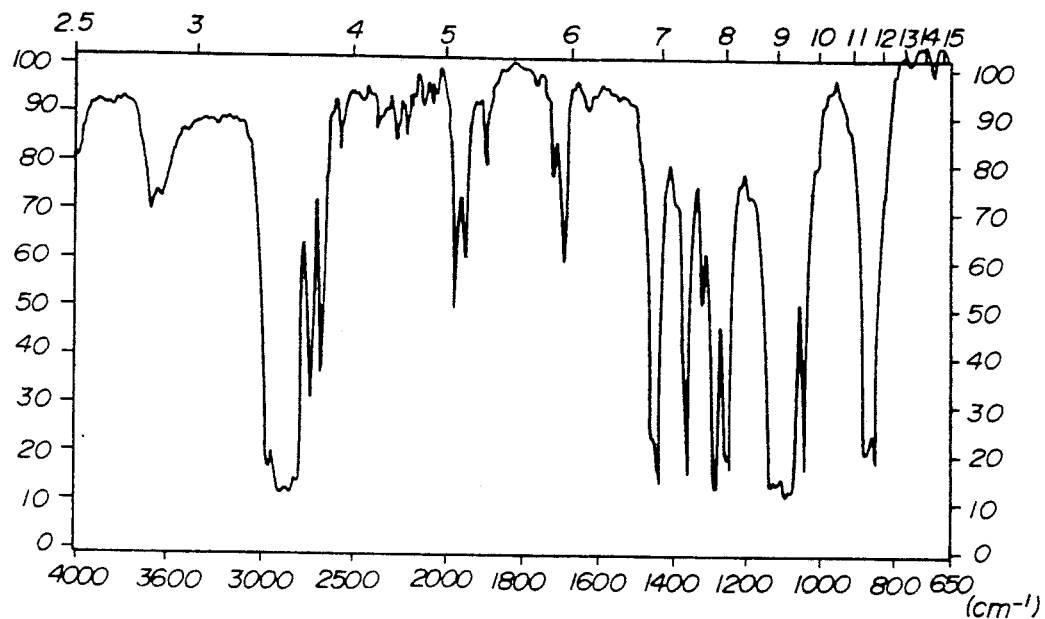
FIG. 5 shows a chart of IR spectrum of a maleimide block copolymer produced in Example 3-1.
Figure 6:
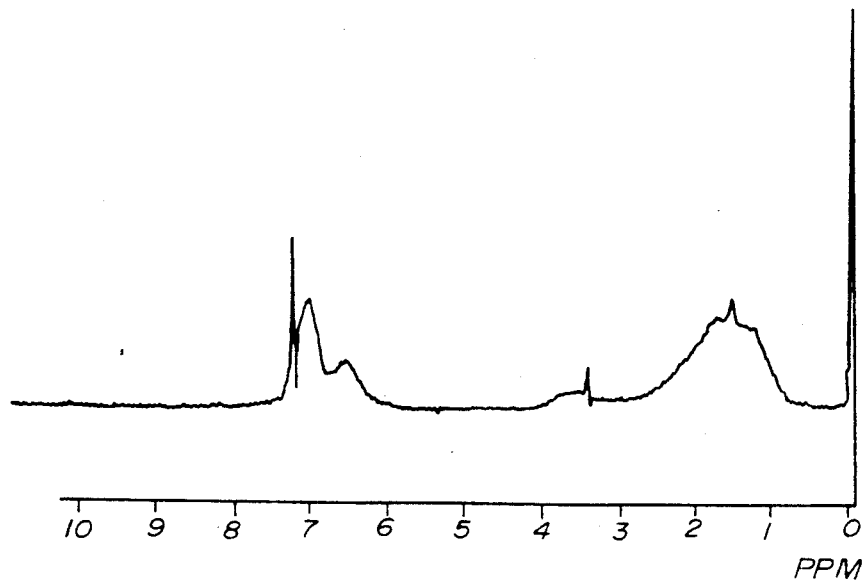
FIG. 6 shows a chart of NMR spectrum of a maleimide block copolymer produced in Example 3-1.

The limiting viscosity [$\eta$] of the produced white-colored polymer at 30° C. in toluene was 1.02, whereas the viscosity average molecular weight was 415000. Analyses by IR absorption spectrum showed the absorption by the carbonyl group of the maleimide group at 1695 cm$^{-1}$, while the absorption by the carbonyl group of the polymeric peroxide was not noticed. Analyses by hydrogen nuclear magnetic resonance showed the absorption by the phenyl ring of styrene. The IR absorption spectrum and the NMR spectrum are shown in the charts of FIGS. 5 and 6, respectively.

Then unblocked polystyrene was extracted by a Soxhlet extractor, using cyclohexane as the solvent, to find the blocking efficiency from the weight of the unblocked polystyrene. As a result, the blocking efficiency was found to be 74%.

From the above results, this polymer was identified as a block copolymer having the cyclohexyl maleimide copolymer and polystyrene as the block units.

EXAMPLES 3-2 TO 3-11

Maleimide block copolymers were prepared in the same way as in Example 3-1, except changing the kinds of the maleimides and vinyl monomers of the respective block units, the ratio of each block unit, the kinds and the charged amounts of the polymeric peroxides, the polymerization temperature and the polymerization time. The conditions and the results are shown in Table 3-1.

TABLE 3-1

| | | Examples | | |
|---|---|---|---|---|
| No. | | 3-2 | 3-3 | 3-4 |
| Block Unit A | Maleimides Charge (in parts) | Cyclohexyl Maleimide 40 | Benzyl Maleimide 80 | Benzyl Maleimide 120 |
| | Polymeric Peroxides | $+C(CH_2)_4CO(CH_2CH_2O)_3C(CH_2)_4COO+_{16.5}$ $\|\phantom{x}\|$ $O\phantom{xxx}O$ | $+C(CH_2)_4CO(CH_2CH_2O)_3(CH_2)_4COO+_{16.5}$ $\|\phantom{x}\|$ $O\phantom{xxx}O$ | $+C(CH_2)_{10}COCH_2CH_2OC(CH_2)_{10}COO+_{19.0}$ $\|\phantom{x}\|$ $O\phantom{xxx}O$ |
| | Charge (in parts) | 10 | 4 | 10 |
| | Solvents | Methylethylketone | Toluene | Methylethylketone |
| | Charge (in parts) | 10 | 20 | 20 |
| | Polymerization Temperature (°C.) | 70 | 65 | 65 |
| | Polymerization Time (hr) | 2 | 4 | 8 |
| Block Unit B | Vinyl Monomers | Styrene | Styrene | Methyl Methacrylate |
| | Charge (in parts) | 80 | 40 | 20 |
| | Polymerization Temperature (°C.) | 80 | 80 | 75 |
| | Polymerization Time (hr) | 10 | 8 | 4 |
| Yield of Block Copolymer (in parts) | | 108 | 106 | 112 |
| Appearance | | White solid | White Solid | White Solid |
| Viscosity Average Molecular Weight | | 398000 | 520000 | 864000 |
| Molecular Weight of Block Unit A | | 86000 | 162000 | 460000 |
| Maleimide Content (wt. %) Computed from Total Nitrogen Amount | | 41 | 63 | 86 |
| Block Efficiency (%) | | 78 | 68 | 66 |

| | | Examples | | |
|---|---|---|---|---|
| No. | | 3-5 | 3-6 | 3-7 |
| Block Unit A | Maleimides Charge (in parts) | Phenyl Maleimide 80 | Methyl Maleimide 60 | Octadecyl Maleimide 80 |
| | Polymeric Peroxides | $+C(CH_2)_{10}COCH_2CH_2OC(CH_2)_{10}COO+_{9.0}$ $\|\phantom{x}\|$ $O\phantom{xxx}O$ | $+C(CH_2)_4COCH_2CH_2OC(CH_2)_4COO+_{8.8}$ $\|\phantom{x}\|$ $O\phantom{xxx}O$ | $+C(CH_2)_4COCH_2CH_2OC(CH_2)_4COO+_{8.8}$ $\|\phantom{x}\|$ $O\phantom{xxx}O$ |
| | Charge (in parts) | 30 | 10 | 6 |
| | Solvents | Methylethylketone | Methylethylketone | — |
| | Charge (in parts) | 10 | 10 | |
| | Polymerization Temperature (°C.) | 85 | 70 | 75 |
| | Polymerization Time (hr) | 8 | 4 | 3 |
| Block Unit B | Vinyl Monomers | Styrene 60 Acrylonitrile 20 | n-Butyl Acrylate 40 | Methyl Methacrylate 60 Ethyl Acrylate 20 |
| | Charge (in parts) | | | |

TABLE 3-1-continued

| | | 3-8 | 3-9 |
|---|---|---|---|
| | Polymerization Temperature (°C.) | 85 | 65 | 70 |
| | Polymerization Time (hr) | 10 | 8 | 6 |
| Yield of Block Copolymer (in parts) | | 142 | 88 | 146 |
| Appearance | | Pale Yellow solid | White Solid | White Solid |
| Viscosity Average Molecular Weight | | 5100 | 388000 | 286000 |
| Molecular Weight of Block Unit A | | 2600 | 96000 | 78000 |
| Maleimide Content (wt. %) Computed from Total Nitrogen Amount | | 51 | 55 | 48 |
| Block Efficiency (%) | | 61 | 68 | 66 |

Examples

| | | 3-8 | 3-9 |
|---|---|---|---|
| Block Unit A | Maleimides Charge (in parts) | t-Butyl Maleimide 60 | 2-Ethylhexyl Maleimide 30 |
| | Polymeric Peroxides | $+COOC(CH_3)_2CH_2CH_2C(CH_3)_2OOC(CH_2)_2 +_{4.6}$ | $+CO(CH_2)_2OCOOC(CH_3)_2CH_2CH_2C(CH_3)_2OO+_{7.1}$ |
| | | $\parallel$ | $\parallel$ $\parallel$ |
| | | $O$ | $O$ $O$ |
| | Charge (in parts) | 10 | 10 |
| | Solvents | — | — |
| | Charge (in parts) | 75 | 75 |
| | Polymerization Temperature (°C.) | 4 | 3 |
| | Polymerization Time (hr) | | |
| Block Unit B | Vinyl Monomers | Styrene | Methyl Methacrylate 40 |
| | Charge (in parts) | 60 | Styrene 40 |
| | Polymerization Temperature (°C.) | 80 | 60 |
| | Polymerization Time (hr) | 10 | 12 |
| | | 104 | 104 |
| Yield of Block Copolymer (in parts) | | White Solid | White Solid |
| Appearance | | 684000 | 240000 |
| Viscosity Average Molecular Weight | | | |
| Molecular Weight of Block Unit A | | 69000 | 59000 |
| Maleimide Content (wt. %) Computed from Total Nitrogen Amount | | 51 | 29 |
| Block Efficiency (%) | | 77 | 70 |

Examples

| | | 3-10 | 3-11 |
|---|---|---|---|
| Block Unit A | Maleimides | Cyclohexyl Maleimide | Cyclohexyl Maleimide |

TABLE 3-1-continued

| | | | |
|---|---|---|---|
| | Charge (in parts) | 60 | 70 |
| | Polymeric Peroxides | $+C(CH_2)_4CO(CH_2CH_2O)_3CO(CH_2)_4COO+_{6.5}$ | $+C(CH_2)_4CO(CH_2CH_2O)_3CO(CH_2)_4COO+_{6.5}$ |
| | | $\parallel \quad\quad\quad\quad\quad\quad\quad\quad\quad\quad\quad\quad\quad \parallel$ | $\parallel \quad\quad\quad\quad\quad\quad\quad\quad\quad\quad\quad\quad\quad \parallel$ |
| | | O   O | O   O |
| | Charge (in parts) | 6 | 4 |
| | Solvents | Methylethylketone | Methylethylketone |
| | Charge (in parts) | 20 | 10 |
| | Polymerization Temperature (°C.) | 70 | 75 |
| | Polymerization Time (hr) | 6 | 3 |
| Block Unit B | Vinyl Monomers | Vinyl Acetate | Vinyl Chloride |
| | Charge (in parts) | 40 | 30 |
| | Polymerization Temperature (°C.) | 65 | 60 |
| | Polymerization Time (hr) | 8 | 12 |
| Yield of Block Copolymer (in parts) | | 89 | 92 |
| Appearance | | White Solid | White Solid |
| Viscosity Average Molecular Weight | | 392000 | 260000 |
| Molecular Weight of Block Unit A | | 168000 | 148000 |
| Maleimide Content (wt. %) Computed from Total Nitrogen Amount | | 61 | 69 |
| Block Efficiency (%) | | 62 | 58 |

EXAMPLE 3-12

The thermal and mechanical properties of the block copolymer, prepared by Example 3-1 and having polycyclohexyl maleimide and polystyrene as the block units, were measured by the following method.

Test pieces were prepared by press shaping powders of the block copolymer in a heating press at 230° C. and under 120 kg/cm² for ten minutes to produce a sheet, and punching the sheet.

By way of the thermal properties, the Vicat softening temperature was measured in accordance with JIS K-7206. The melt flow rate was measured using a simplified melt indexor under a load of 10 kg/cm² in accordance with JIS K-7210. The tensile strength and the elongation were simultaneously measured. The results are shown in Table 3-2.

COMPARATIVE EXAMPLE 3-1

Test pieces were prepared and the thermal and mechanical properties thereof were measured in the same way as in Example 3-12, except using the copolymer obtained by copolymerizing 50 parts of cyclohexyl maleimide and 50 parts of styrene. The results are shown in Table 3-2.

the product was 99.5%. Analyses by IR absorption spectrum showed the absorption by the carbonyl group of the ester group at 1725 cm⁻¹, the absorption by the carbonyl group of the diacyl group at 1780 cm⁻¹ and at 1805 cm⁻¹ and the absorption by the peroxy group at 875 cm⁻¹.

EXAMPLE 4-1

250 parts of an aqueous solution of 0.5 wt. % polyvinyl alcohol were charged into a four-mouthed flask fitted with a thermometer, a stirrer and a Dimroth condenser. Into the same flask was dispersed and then charged a solution in 10 parts of methylethylketone of 48 parts of cyclohexyl maleimide, 32 parts of methyl methacrylate and 10 parts of polymeric peroxide of the formula

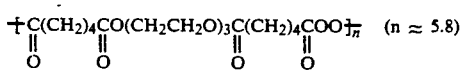   (n ≈ 5.8)

prepared in Reference Example 4-1. Polymerization was carried out under stirring at 75° C. for three hours while the atmosphere in the reactor was replaced by a nitrogen gas. After the reaction system was cooled to

TABLE 3-2

| No. | Example 3-12 | Comparative Example 3-1 |
|---|---|---|
| Sample | Block Copolymer Composition Prepared in Ex. 1 | Copolymer Consisting of 50 Parts of Cyclohexyl Maleimide and 50 Parts of Styrene |
| Vicat Softening Temperature (°C.) | 125 | 110 |
| Melt Flow Rate (g/10 min.) | 4.8 | 2.8 |
| Tensile Strength (kg/cm²) | 430.6 | 250.6 |
| Elongation (%) | 3 | 0.4 |

REFERENCE EXAMPLE 4-1

Preparation of

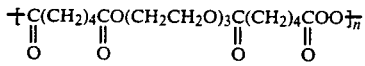

183 parts of dichloride adipate and 75 parts of triethyleneglycol were charged into a four-mouthed flask fitted with a thermometer and a stirrer, and the reaction system was stirred at 20° C. for 60 minutes under a nitrogen gas stream to produce 210 parts of viscous colorless liquid triethyleneglycol bis(adipoyl chloride).

420 parts of an aqueous solution of 10 wt. % sodium hydroxide and 50 wt. % aqueous hydrogen peroxide were charged into a four-mouthed flask fitted with a thermometer, a stirrer and a dropping funnel, to produce an aqueous solution of sodium peroxide. While the reaction system was stirred vigorously, and the reaction temperature was maintained at 5° C., 176 parts of the previously prepared triethyleneglycol bis(adipoyl chloride) were added dropwise to the reaction system over 20 minutes. After the stirring was continued in this state, a white-colored substance was produced. This white-colored substance was filtered, washed twice with 1 lit. of cold water and dried in vacuum. 140 parts of the dried product were obtained. The molecular weight of the thus produced white-colored powders, as measured by an apparatus ("VPO-115" manufactured by Hitachi Seisakusho Co., Ltd.) operating in accordance with the vapor pressure equilibrium method, was 2340 (n≈5.8), while the amount of active oxygen, as measured by the iodometric method, was 2.19 wt. %. Thus, the purity of room temperature, a part of the produced polymer was purified and analyzed in the following manner. Specifically, after the polymer was washed with water and dissolved in chloroform, it was charged into a large quantity of methanol to precipitate the polymer. This polymer was filtered and dried in vacuum to produce white-colored powders. The limiting viscosity of these powders was measured at 30° C., using toluene as the solvent. The limiting viscosity [η] was 0.358, whereas the viscosity average molecular weight was 97000. The amount of active nitrogen, as found by the iodometric method, was 0.24 wt. %, whereas the ratio of the peroxy groups introduced into the polymer molecule was 6.1 wt. %. Analyses of the IR absorption spectrum showed the absorption by the carbonyl group of the maleimide group at 1700 cm⁻¹, the absorption by the carbonyl group of the diacyl group of the polymeric peroxide at 1805 cm⁻¹ and at 1780 cm⁻¹, and the absorption by the carbonyl group of methyl methacrylate at 1725 cm⁻¹. The total amount of nitrogen, as found by the Kjeldahl analysis, was 4.5 wt. %, whereas the content of the maleimide segment in the polymer was 58 wt. %.

From the above results, this polymer was identified as a cyclohexyl maleimide - methyl methacrylate copolymer (block unit A') having peroxy bond in the molecule.

Then, 50 parts of a styrene monomer were introduced into a reaction vessel filled with the block unit A' with stirring at room temperature and the resulting mass was then subjected to dispersion. The temperature was then raised and polymerization was carried out at 80° C. for 8 hours. The produced polymer was dissolved in chloroform and the resulting solution was charged into a large quantity of methanol to precipitate the polymer, which was then filtered and dried in vacuum to produce 120 parts of a white-colored polymer.

Figure 7:
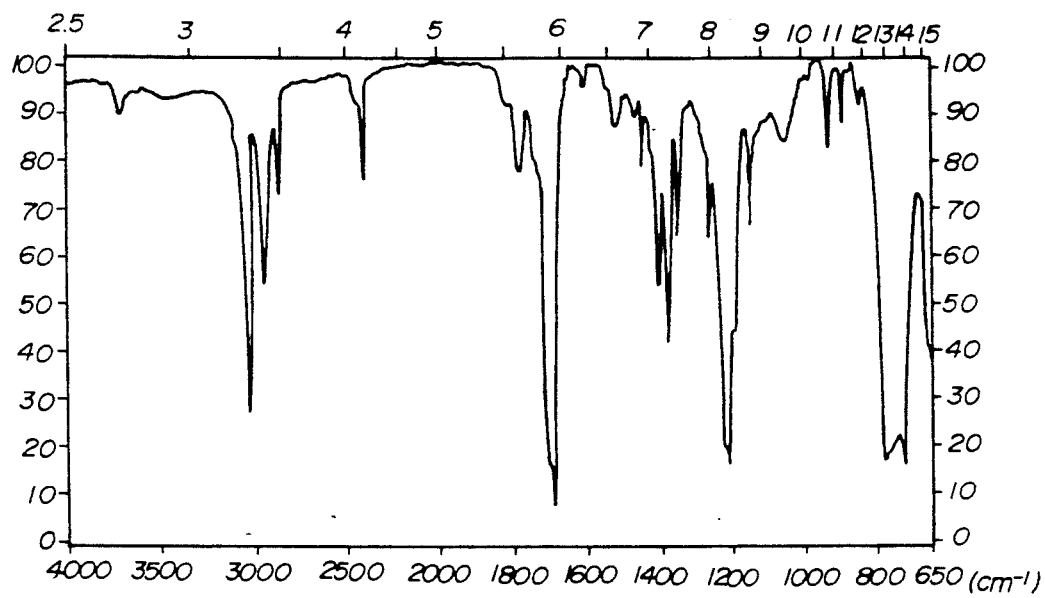
FIG. 7 shows a chart of IR spectrum of a maleimide block copolymer produced in Example 4-1.
Figure 8:
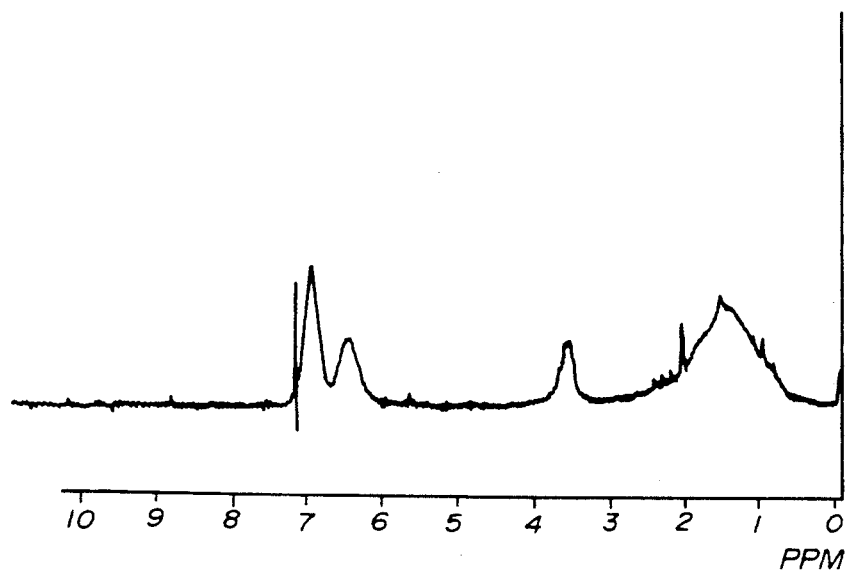
FIG. 8 shows a chart of NMR spectrum of a maleimide block copolymer produced in Example 4-1.

The limiting viscosity [η] of the produced white-colored polymer at 30° C. in toluene was approximately 0.948, whereas the viscosity average molecular weight was 375000. Analyses by IR absorption spectrum showed the absorption by the carbonyl group of the maleimide group at 1700 cm$^{-1}$, the absorption by the carbonyl group of methyl methacrylate at 1725 cm$^{-1}$ while the absorption by the carbonyl group of the polymeric peroxide was not noticed. Analyses by proton nuclear magnetic resonance showed the absorption by the phenyl ring. The IR absorption spectrum and the NMR spectrum are shown in the charts of FIGS. 7 and 8, respectively.

Then, unblocked polystyrene was extracted by a Soxhlet extractor, using cyclohexane as the solvent, to find the blocking efficiency from the weight of the unblocked polystyrene. As a result, the blocking efficiency was found to be 74%.

From the above results, this polymer was identified as a block copolymer consisting mainly of a block copolymer having the cyclohexyl maleimide - methyl methacrylate copolymer and polystyrene as the block units.

EXAMPLES 4-2 TO 4-12

Maleimide block copolymers were prepared in the same way as in Example 4-1, except changing the compositions and contents of the block units A' and B', the kinds and charged amounts of polymeric peroxide, the polymerization temperature and the polymerization time. The conditions and the results are shown in Table 4-1.

TABLE 4-1

| | No. | Examples | | |
|---|---|---|---|---|
| | | 4-2 | 4-3 | 4-4 |
| Block Unit A | Maleimides | Cyclohexyl Maleimide | Benzyl Maleimide | Benzyl Maleimide |
| | Charge (in parts) | 45 | 20 | 35 |
| | Vinyl Monomers | Methyl Methacrylate | Methyl Methacrylate | n-Butyl Acrylate |
| | Charge (in parts) | 5 | 30 | 15 |
| | Polymeric Peroxides | $+C(CH_2)_4CO(CH_2CH_2O)_3C(CH_2)_4COO+_{5,5}$ $\|\quad\quad\quad\quad\quad\quad\quad\quad\quad\quad\quad\quad\|$ $O\quad\quad\quad\quad\quad\quad\quad\quad\quad\quad\quad\quad O$ | $+C(CH_2)_4CO(CH_2CH_2O)_3C(CH_2)_4COO+_{5,5}$ $\|\quad\quad\quad\quad\quad\quad\quad\quad\quad\quad\quad\quad\|$ $O\quad\quad\quad\quad\quad\quad\quad\quad\quad\quad\quad\quad O$ | $+C(CH_2)_{10}COCH_2CH_2OC(CH_2)_{10}COO+_O$ $\|\quad\quad\quad\quad\quad\quad\quad\quad\quad\quad\quad\quad\|$ $O\quad\quad\quad\quad\quad\quad\quad\quad\quad\quad\quad\quad O$ |
| | Charge (in parts) | 1 | 12 | 6 |
| | Solvents | Methylethylketone | Toluene | Toluene |
| | Charge (in parts) | 10 | 5 | 5 |
| | Polymerization Temperature (°C.) | 60 | 65 | 60 |
| | Polymerization Time (hr) | 4 | 5 | 3 |
| Block Unit B | Vinyl Monomers | Styrene | Styrene 37 Acrylonitrile 13 | Methyl Methacrylate |
| | Charge (in parts) | 50 | 70 | 80 |
| | Polymerization Temperature (°C.) | 70 | | 65 |
| | Polymerization Time (hr) | 8 | 7 | 7 |
| Yield of Block Copolymer (in parts) | | 92 | 88 | 121 |
| Appearance | | White Solid | Pale Yellow Solid | White Solid |
| Viscosity Average Molecular Weight | | 430000 | 340000 | 746000 |
| Molecular Weight of Block Unit A | | 182000 | 78000 | 125000 |
| Maleimide Content (wt. %) Computed from Total Nitrogen Amount | | 43 | 21 | 25 |
| Block Efficiency (%) | | 73 | 69 | 64 |

| | No. | Examples | | |
|---|---|---|---|---|
| | | 4-5 | 4-6 | 4-7 |
| Block Unit A | Maleimides | Phenyl Maleimide | Methyl Maleimide | Octadecyl Maleimide |
| | Charge (in parts) | 25 | 10 | 60 |
| | Vinyl Monomers | Styrene | Vinyl Acetate | Styrene |
| | Charge (in parts) | 25 | 10 | 20 |
| | Polymeric Peroxides | $+C(CH_2)_{10}COCH_2CH_2OC(CH_2)_{10}COO+_O$ $\|\quad\quad\quad\quad\quad\quad\quad\quad\quad\quad\quad\quad\|$ $O\quad\quad\quad\quad\quad\quad\quad\quad\quad\quad\quad\quad O$ | $+COOC(CH_2)_2CH_2CH_2C(CH_3)_2OOC(CH_2)_2+_{6,6}$ $\|\quad\quad\quad\quad\quad\quad\quad\quad\quad\quad\quad\quad\|$ $O\quad\quad\quad\quad\quad\quad\quad\quad\quad\quad\quad\quad O$ | $+C(CH_2)_4COCH_2CH_2OC(CH_2)_4COO+_{8,8}$ $\|\quad\quad\quad\quad\quad\quad\quad\quad\quad\quad\quad\quad\|$ $O\quad\quad\quad\quad\quad\quad\quad\quad\quad\quad\quad\quad O$ |
| | Charge (in parts) | 10 | 5 | 10 |
| | Solvents | Methylethylketone | Toluene | Methylethylketone |
| | Charge (in parts) | 15 | 10 | 10 |
| | Polymerization Temperature (°C.) | 55 | 65 | 60 |

TABLE 4-1-continued

| | | 3 | 4 |
|---|---|---|---|
| Block Unit B | Polymerization Time (hr) | 6 | |
| | Vinyl Monomers Charge (in parts) | Methyl Methacrylate 30<br>Ethyl Acrylate 20 | Methyl Methacrylate 80 |
| | Polymerization Temperature (°C.) | 65 | 70 |
| | Polymerization Time (hr) | 8 | 12 |
| Yield of Block Copolymer (in parts) | | 88 | 82 |
| Appearance | | Pale Yellow Solid | White Solid |
| Viscosity Average Molecular Weight | | 510000 | 446000 |
| Molecular Weight of Block Unit A | | 118000 | 216000 |
| Maleimide Content (wt. %) Computed from Total Nitrogen Amount | | 23 | 9 |
| Block Efficiency (%) | | 61 | 58 |

| | | Examples | | |
|---|---|---|---|---|
| | | 4-8 | 4-9 | 4-10 |
| Block Unit A | Maleimides Charge (in parts) | t-Butyl Maleimide 15 | Cyclohexyl Maleimide 40 | Cyclohexyl Maleimide 20 |
| | Vinyl Monomers Charge (in parts) | Methyl Methacrylate 35 | Styrene 20 | Styrene 24<br>Acrylonitrile 6 |
| | Polymeric Peroxides | $+C(CH_2)_2OCOOC(CH_3)_2CH_2CH_2C(CH_3)_2OO+_{4.5}$<br>$\parallel$                                                                                               $O | $+C(CH_2)_4CO(CH_2CH_2O)_3(CH_2)_4COO+_{5.8}$<br>$\parallel$                                                                                          $O | $+C(CH_2)_4CO(CH_2CH_2O)_3(CH_2)_4COO+_{5.8}$<br>$\parallel$                                                                                           $O |
| | Charge (in parts) | 5 | 8 | 8 |
| | Solvents | — | Methylethylketone | Methylethylketone |
| | Charge (in parts) | 60 | 20 | 5 |
| | Polymerization Temperature (°C.) | 4 | 80 | 70 |
| | Polymerization Time (hr) | | 6 | 3 |
| Block Unit B | Vinyl Monomers Charge (in parts) | Vinyl Chloride 50 | n-Butyl Acrylate 10<br>Ethyl Acrylate 10 | Methyl Methacrylate 50 |
| | Polymerization Temperature (°C.) | 55 | 85 | 60 |
| | Polymerization Time (hr) | 8 | 8 | 6 |
| Yield of Block Copolymer (in parts) | | 88 | 64 | 84 |
| Appearance | | White Solid | White Solid | Pale Yellow Solid |
| Viscosity Average Molecular Weight | | 128000 | 6100 | 320000 |
| Molecular Weight of Block Unit A | | 84000 | 2400 | 82000 |
| Maleimide Content (wt. %) Computed from Total | | 18 | 43 | 21 |

TABLE 4-1-continued

| No. | | 4-11 | 4-12 |
|---|---|---|---|
| Block Unit A | Maleimides | Cyclohexyl Maleimide | Phenyl Maleimide |
| | Charge (in parts) | 40 | 20 |
| | Vinyl Monomers | Vinyl Acetate | n-Butyl Acrylate 15 |
| | Charge (in parts) | 10 | Methyl Methacrylate 15 |
| | Polymeric Peroxides | $+C(CH_2)_{10}COCH_2CH_2OC(CH_2)_{10}COO+$ with $=O$ groups | $+C(CH_2)_{10}COCH_2CH_2OC(CH_2)_{10}COO+$ with $=O$ groups |
| | Charge (in parts) | 10 | 0.2 |
| | Solvents | Toluene | Toluene |
| | Charge (in parts) | 20 | 10 |
| | Polymerization Temperature (°C.) | 65 | 45 |
| | Polymerization Time (hr) | 5 | 16 |
| Block Unit B | Vinyl Monomers | Styrene | n-Butyl Acrylate |
| | Charge (in parts) | 30 | 50 |
| | Polymerization Temperature (°C.) | 65 | 50 |
| | Polymerization Time (hr) | 5 | 20 |
| Yield of Block Copolymer (in parts) | | 71 | 88 |
| Appearance | | White Solid | Pale Yellow Solid |
| Viscosity Average Molecular Weight | | 488000 | 980000 |
| Molecular Weight of Block Unit A | | 282000 | 466000 |
| Maleimide Content (wt. %) Computed from Total Nitrogen Amount | | 48 | 17 |
| Block Efficiency (%) | | 71 | 62 |
| Nitrogen Amount Block Efficiency (%) | | 62 | 58 |

Although the present invention has been described with reference to the specific examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. An A-B maleimide block copolymer comprising:

a block unit A having a viscosity average molecular weight of 2,000 to 500,000, said block unit A being represented by the formula (I'')

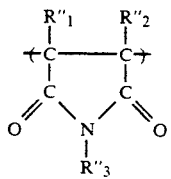

(I'')

wherein $R''_1$, $R''_2$ each stand for a hydrogen atom, a halogen atom or a methyl group and $R''_3$ stands for a straight chain or branched chain C1 to C18 alkyl group, a C3 to C12 cycloalkyl group or a C6 to C18 aryl group or substituted aryl group; and a block unit B having a viscosity average molecular weight of 2,000 to 500,000, said block unit B selected from the group consisting of a homopolymer and a random copolymer having a structural unit of the formula (II'')

$-\!\!+\!CH_2\!\!-\!\!CR''_4R''_5\!\!+\!\!-$  (II'')

wherein $R''_4$ stands for a hydrogen atom or a methyl group and $R''_5$ stands for a hydrogen atom, a chlorine atom, a phenyl group, an alkyl-substituted phenyl group, an acetyl group, a nitrile group or a group

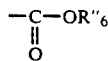

where $R''_6$ stands for C1 to C18 alkyl group, said A-B maleimide block copolymer being produced by preparing said block unit A having polymeric peroxy residues, said block unit A having been obtained by polymerization of a maleimide compound having the formula (III'')

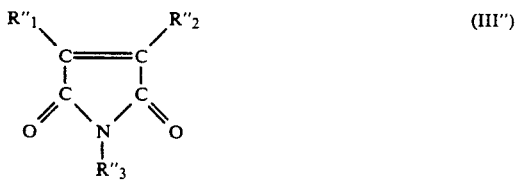

wherein $R''_1$, $R''_2$ and $R''_3$ are as defined above, in the presence of a polymeric peroxide, followed by polymerization of said block unit B with said block unit A having polymeric peroxy residues.

2. An A-B maleimide block copolymer according to claim 1 wherein a monomer of the structural unit represented by the formula (I'') is selected from the group consisting of N-methyl maleimide, N-ethyl maleimide, N-n-propyl maleimide, N-i-propyl maleimide, N-n-butyl maleimide, N-t-butyl maleimide, N-2-ethylhexyl maleimide, N-dodecyl maleimide, N-octadecyl maleimide, N-cyclohexyl maleimide, N-cyclododecyl maleimide, N-phenyl maleimide, N-2-methylphenyl maleimide, N-3-isopropylphenyl maleimide, N-benzyl maleimide and mixtures thereof.

3. An A-B maleimide block copolymer according to claim 1 wherein a monomer of the structural unit represented by the formula (II'') is selected from the group consisting of ethylene, propylene, styrene, α-methylstyrene, p-methylstyrene, vinyl acetate, methyl (meth)acrylate, ethyl (meth)acrylate, n-butyl (meth)acrylate, acrylonitile, methcrylonitrile, vinyl chloride and mixtures thereof.

4. An A-B maleimide block copolymer according to claim 1 wherein a ratio of content of said block unit A to that of said block unit B is 5 wt. % to 95 wt. %:95 wt. % to 5 wt. %, based on total weight of the maleimide block copolymer.

* * * * *